United States Patent [19]

Seo et al.

[11] Patent Number: 5,239,530

[45] Date of Patent: Aug. 24, 1993

[54] METHOD AND APPARATUS FOR DETECTING A TRACK COUNT IN AN OPTICAL DISK APPARATUS FOR RECORDING/REPRODUCING DATA ON/FROM AN OPTICAL DISK

[76] Inventors: Naobumi Seo, Yokohama; Tamane Takahara, Tokyo, both of Japan

[73] Assignee: Canon Kabushiki Kaisha, Tokyo, Japan

[21] Appl. No.: 485,570

[22] Filed: Feb. 27, 1990

[30] Foreign Application Priority Data

| Apr. 19, 1989 | [JP] | Japan | 1-97512 |
| May 24, 1989 | [JP] | Japan | 1-128647 |
| May 24, 1989 | [JP] | Japan | 1-128650 |
| Jun. 21, 1989 | [JP] | Japan | 1-156679 |
| Jun. 21, 1989 | [JP] | Japan | 1-156680 |
| Jun. 29, 1989 | [JP] | Japan | 1-168149 |
| Sep. 29, 1989 | [JP] | Japan | 1-254918 |

[51] Int. Cl.⁵ ............................................. G11B 7/085
[52] U.S. Cl. ..................................... 369/54; 369/32; 369/44.280
[58] Field of Search ............... 369/32, 44.28, 47, 54, 369/58; 360/78.04, 78.11, 78.14

[56] References Cited

U.S. PATENT DOCUMENTS

| 4,697,256 | 9/1987 | Shinkai | 369/44.28 X |
| 4,855,977 | 8/1989 | Getreuer et al. | 369/44.28 X |
| 4,887,253 | 12/1989 | Tateishi | 369/44.28 |
| 4,972,350 | 11/1990 | Sander et al. | 369/44.28 |
| 5,038,334 | 8/1991 | Uchikoshi et al. | 369/44.28 |
| 5,099,467 | 3/1992 | Sumihiro et al. | 369/44.28 X |
| 5,128,916 | 7/1992 | Ito et al. | 369/44.28 X |

OTHER PUBLICATIONS

The Japan Society of Applied Physics and Related Societies No. 3, 2P-ZB-15; M. Shimamoto, Mitsubishi Electric Corp.; May 2, 1989.

Primary Examiner—W. R. Young
Attorney, Agent, or firm—Fitzpatrick, Cella, Harper & Scinto

[57] ABSTRACT

An optical disk apparatus is used for an optical disk having a plurality of types of access marks repeatedly formed on the optical disk, each access mark being constituted by at least two pits. The apparatus comprises an optical head for optically reading a pattern represented by each of the access marks, a discrimination circuit for discriminating whether or not the pattern is correctly read out by the optical head, a storage for storing a pattern of access mark which is discriminated to be correct by the discrimination circuit until the discrimination circuit discriminates the next pattern of the access marks, and cross track count detector for comparing the pattern stored in the storage with the correct pattern discriminated by the discrimination circuit and for calculating the cross track count from these two patterns.

16 Claims, 39 Drawing Sheets

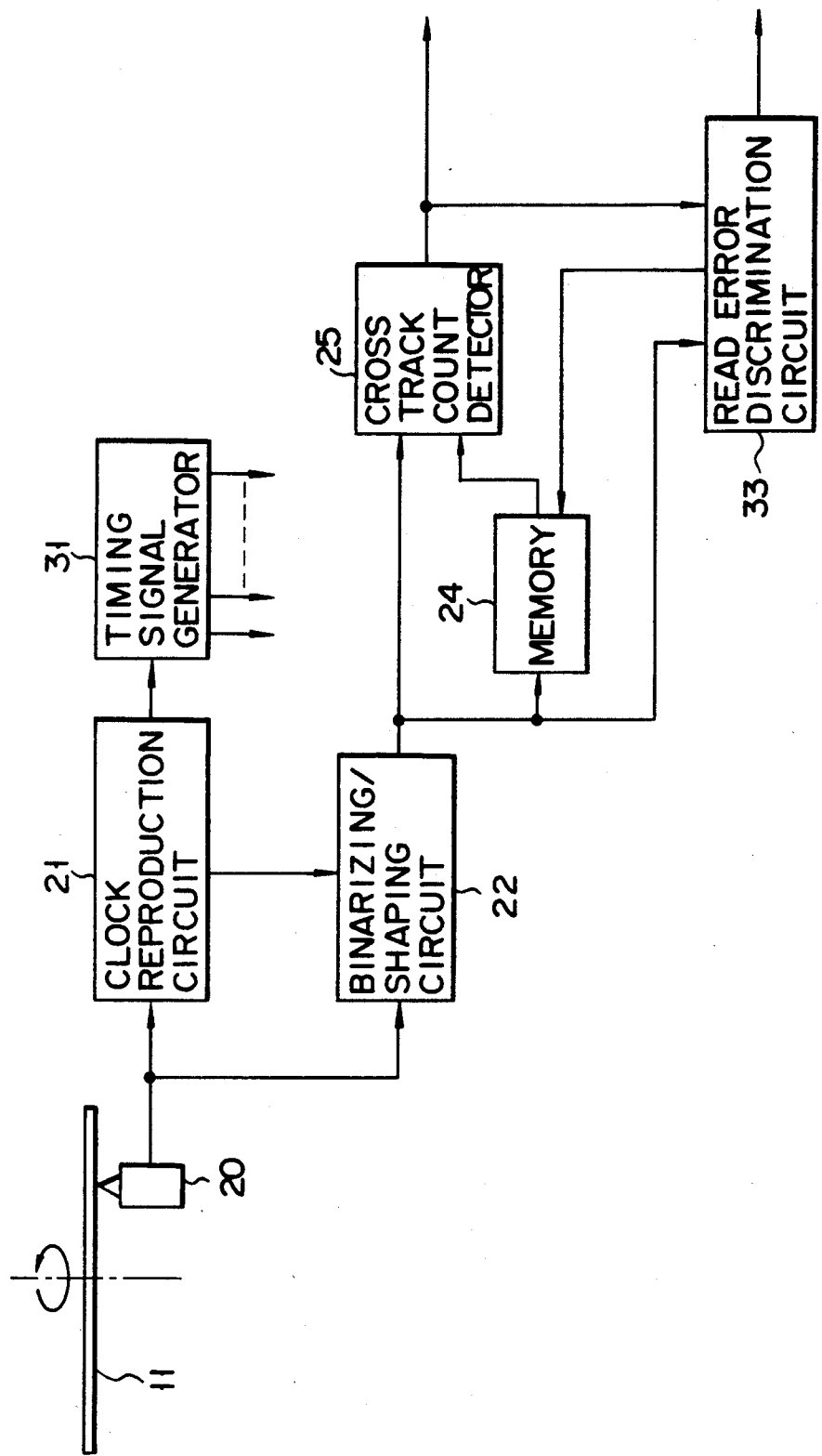
F I G. 3

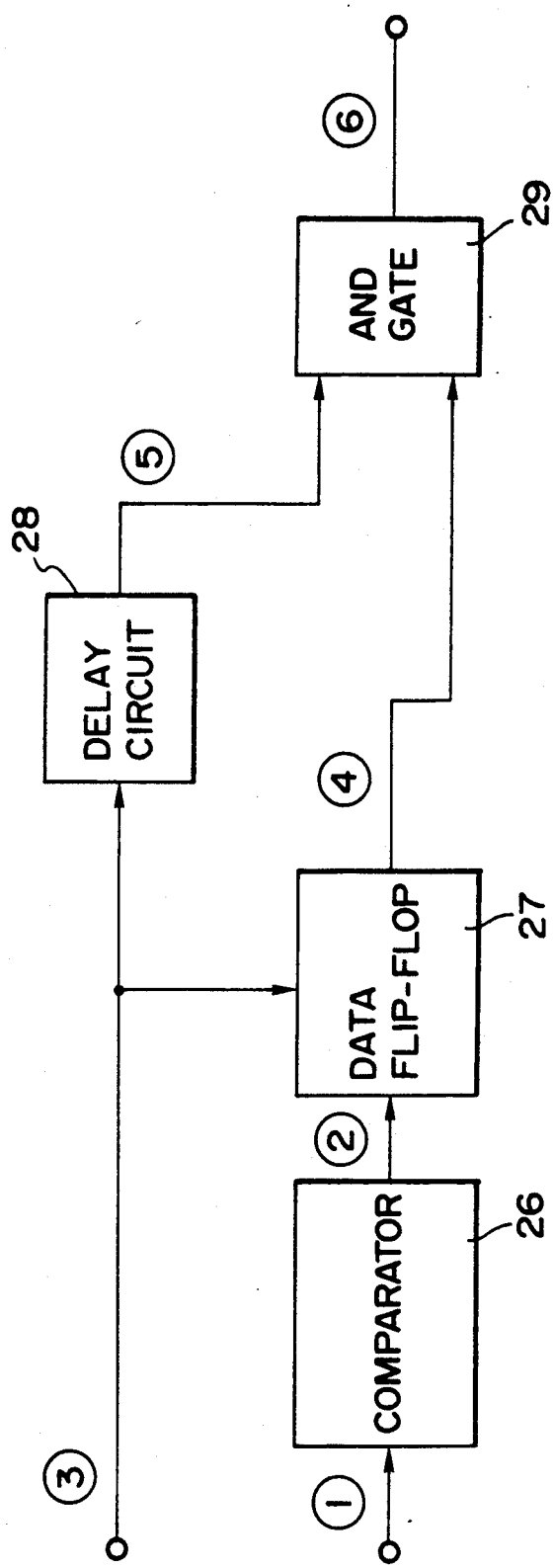
F I G. 5

SIGNAL. S1 
SIGNAL. S2 
SIGNAL. S3 
SIGNAL. S4 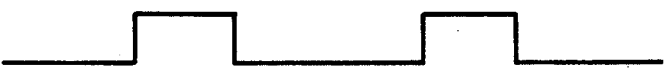
SIGNAL. S5 
SIGNAL. S6 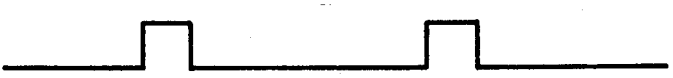
F I G. 6

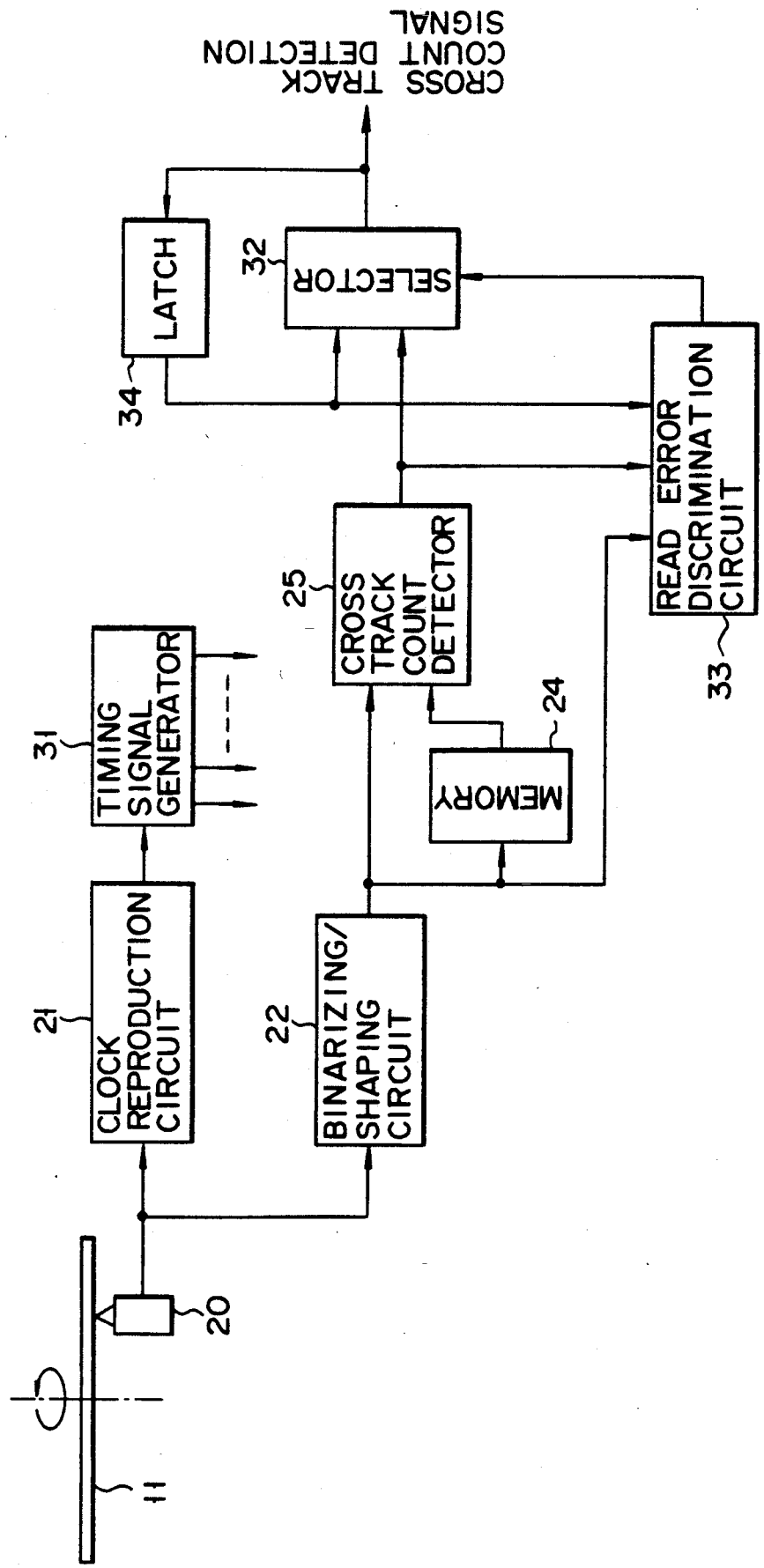
F I G. 8

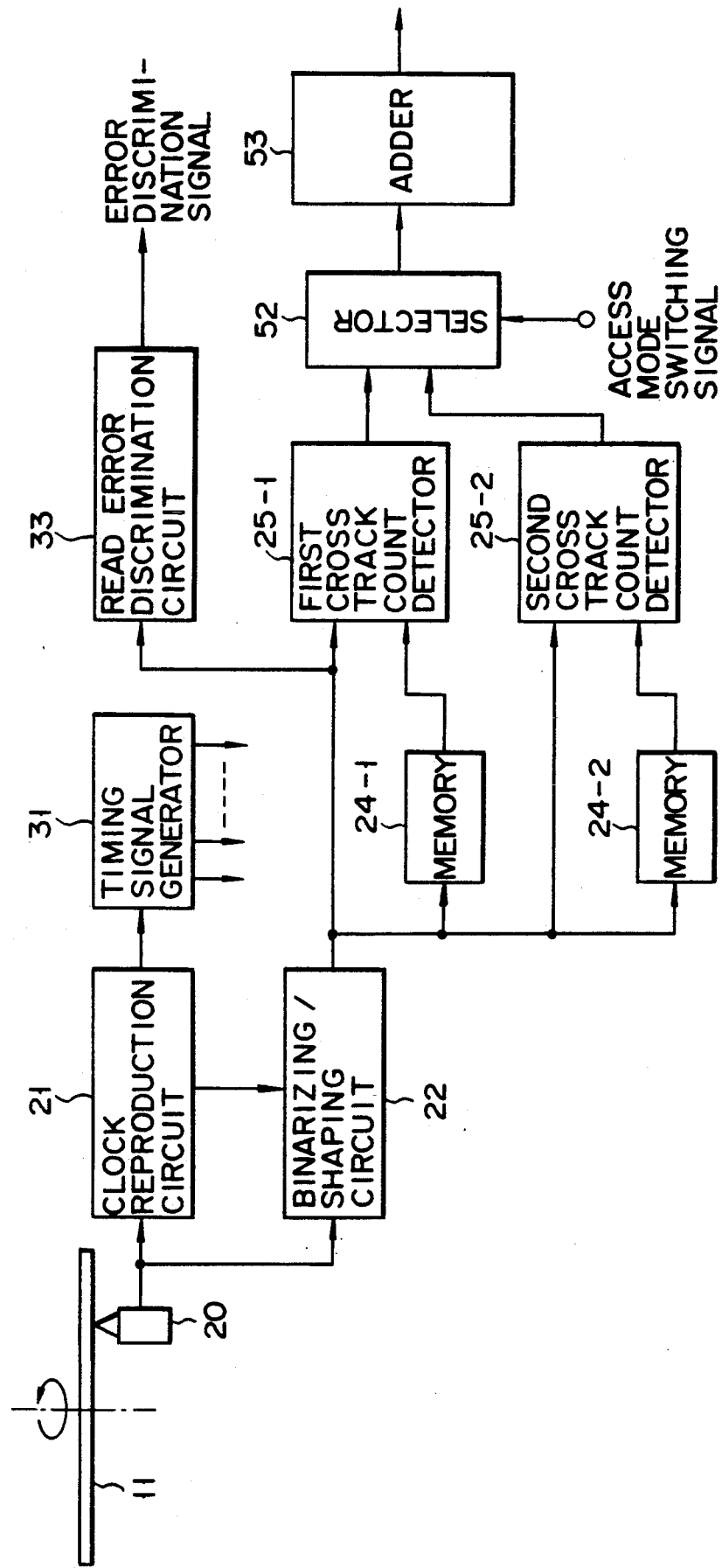
F I G. 10

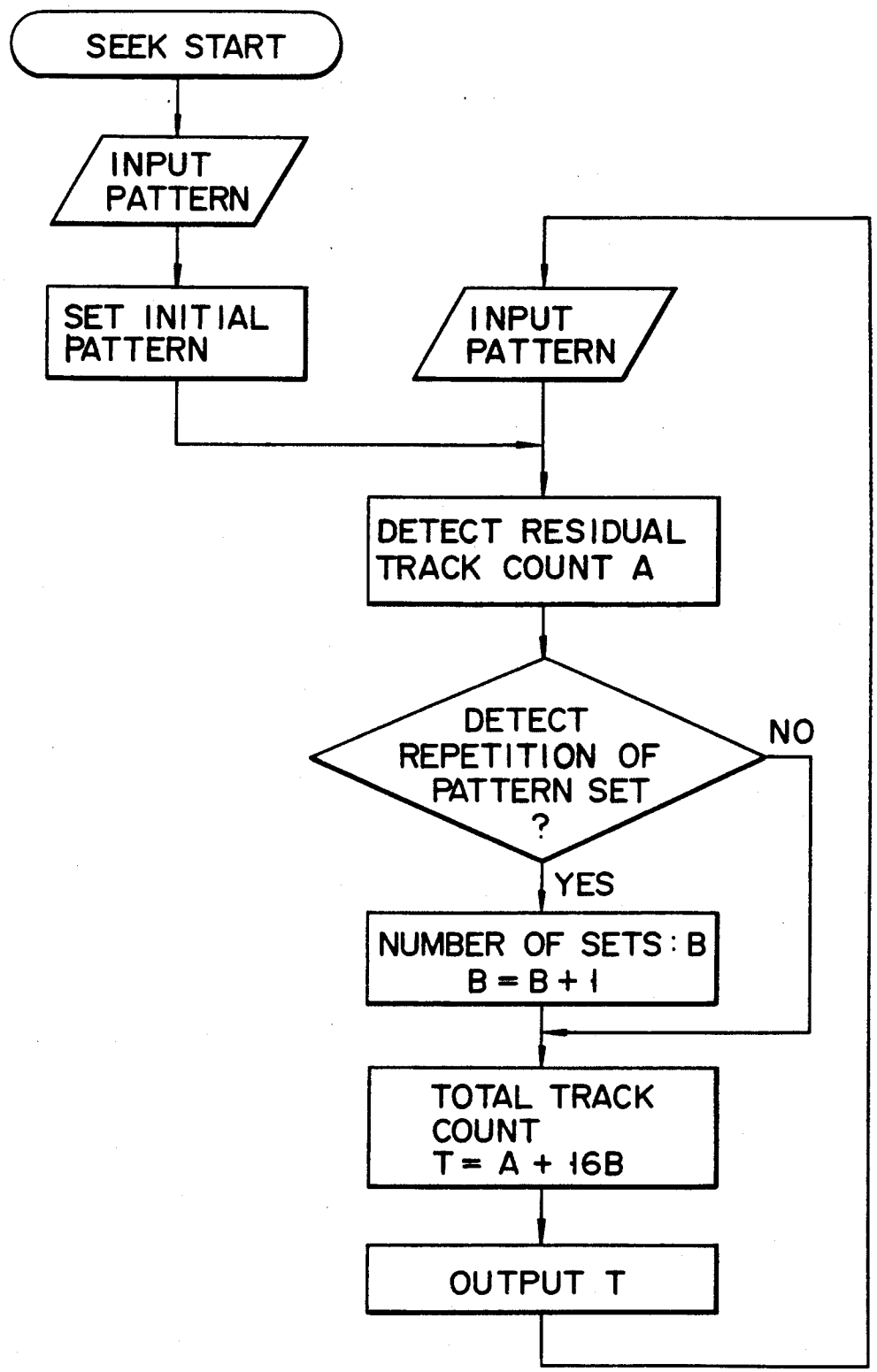
F I G. 12B

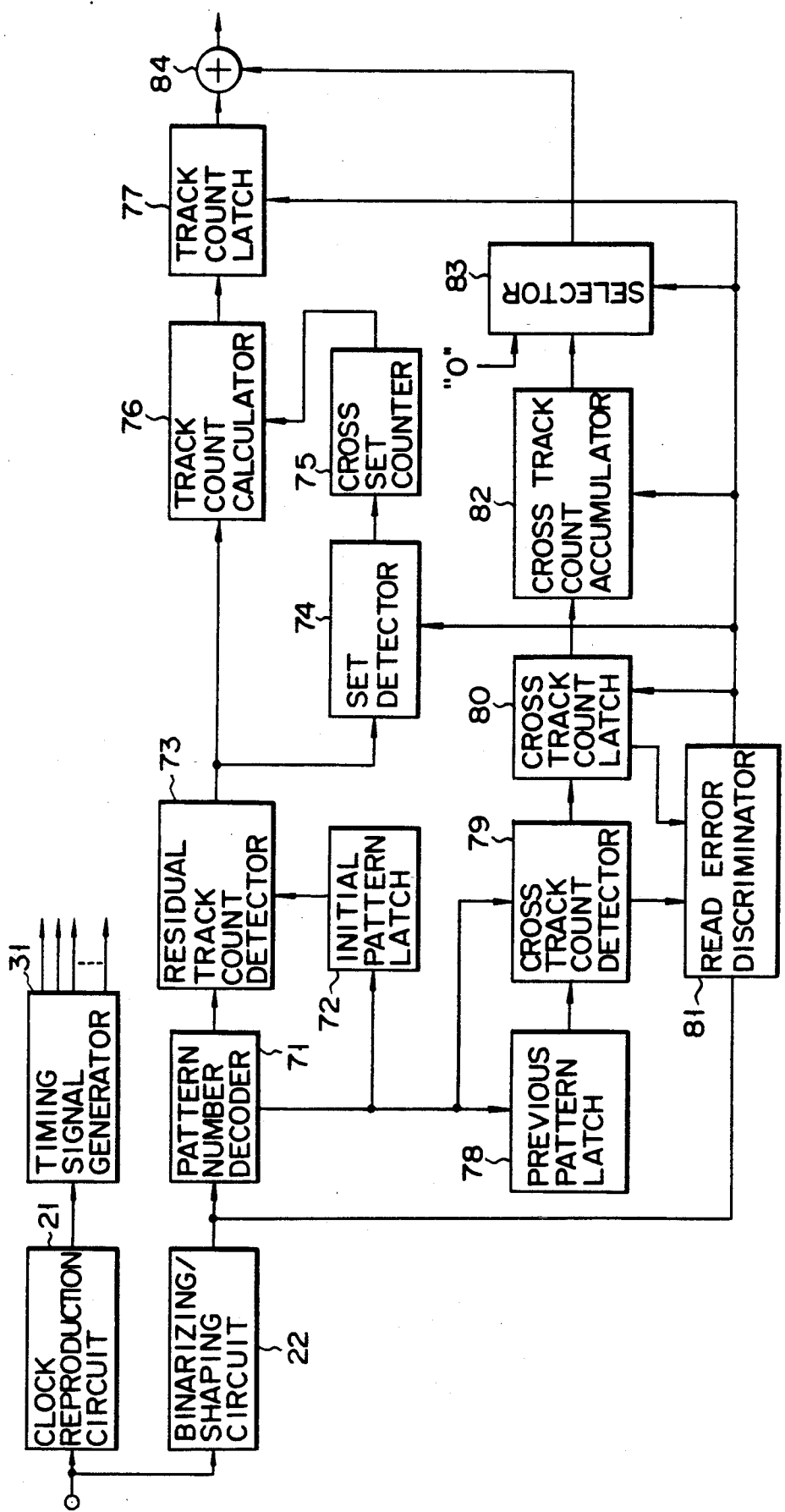
F I G. 13

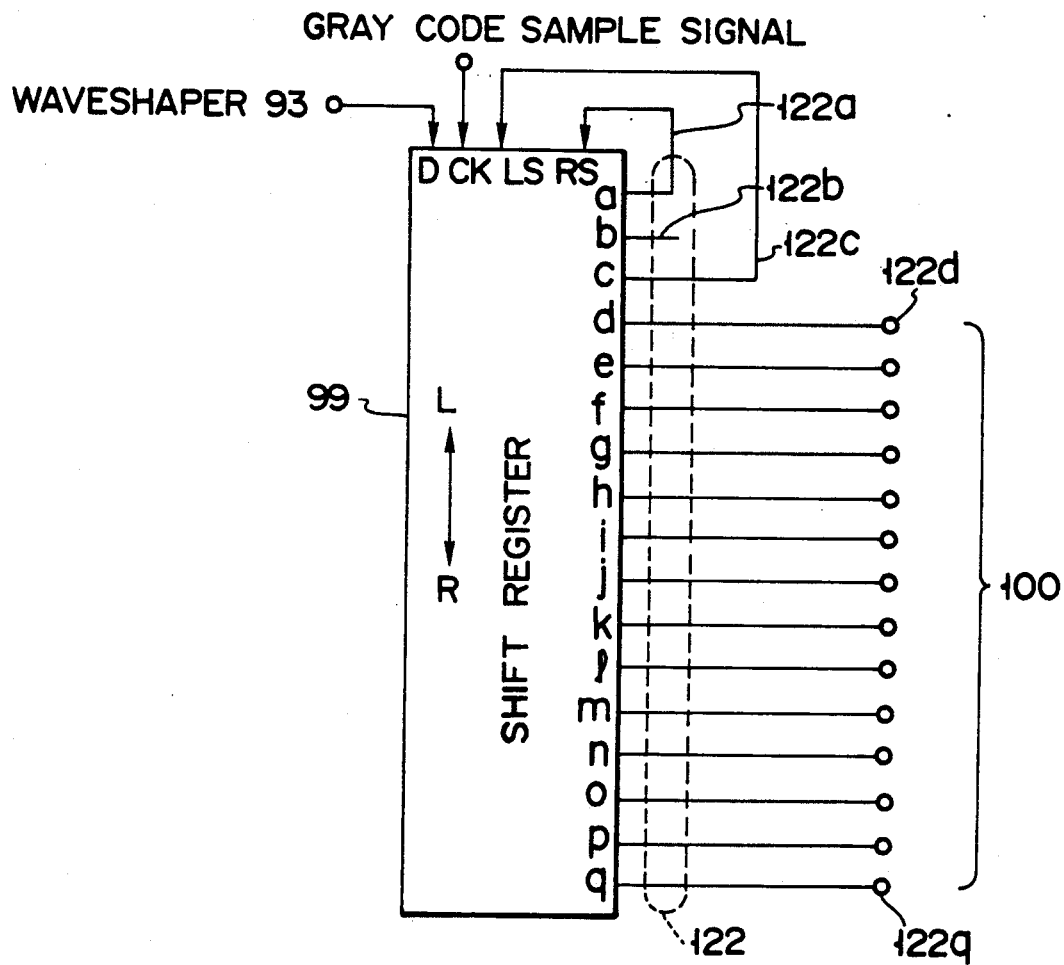
F I G. 16

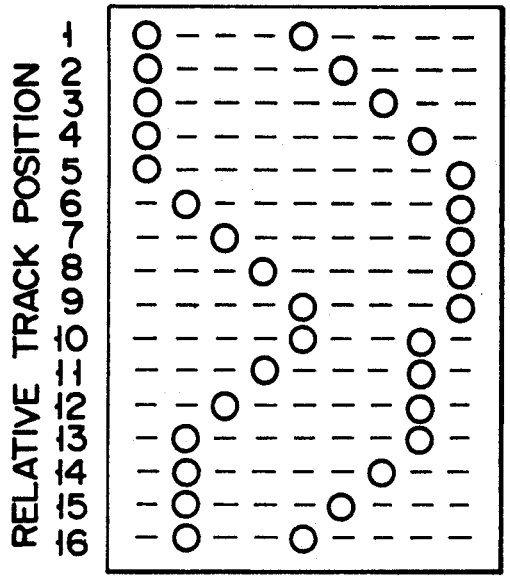
FIG. 38A
FIG. 38B
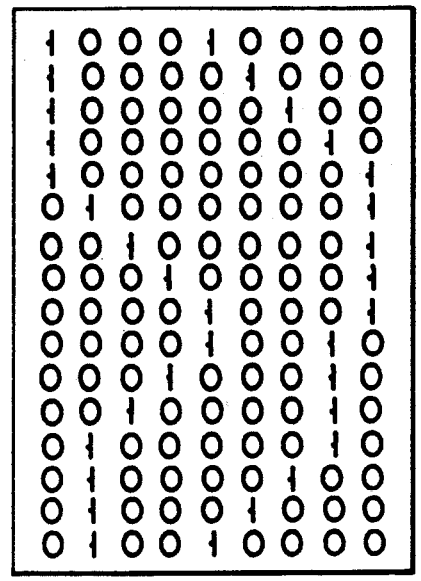
FIG. 39A
FIG. 39B

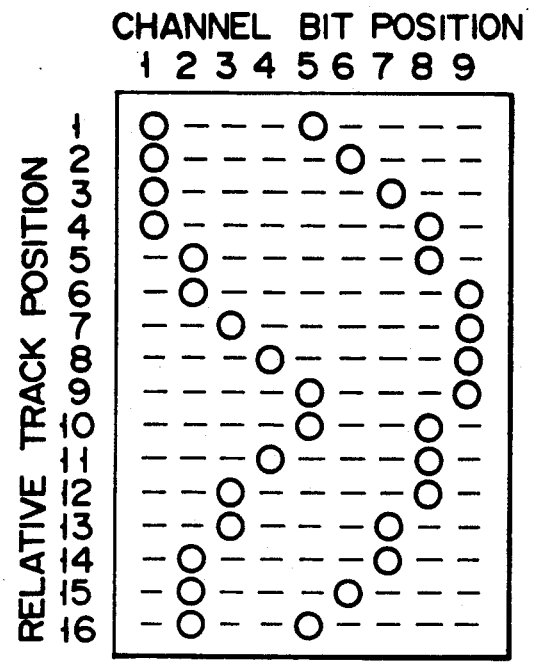
F I G. 40A
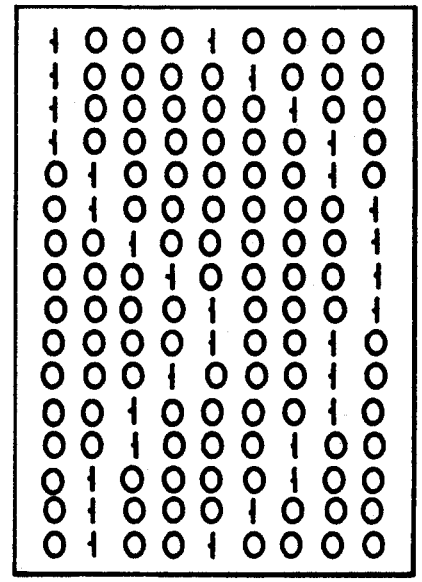
F I G. 40B
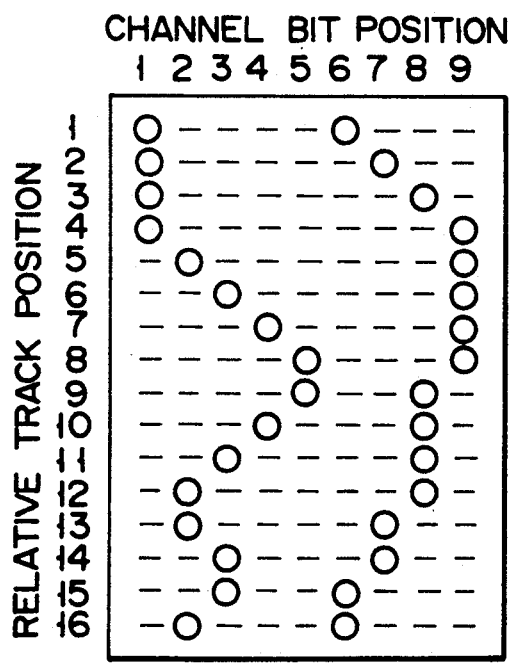
F I G. 41A
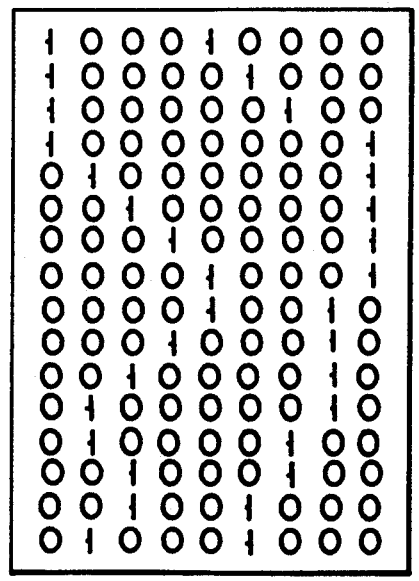
F I G. 41B

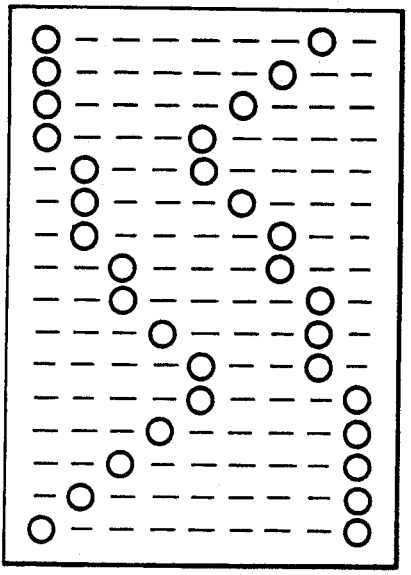
F I G. 46A
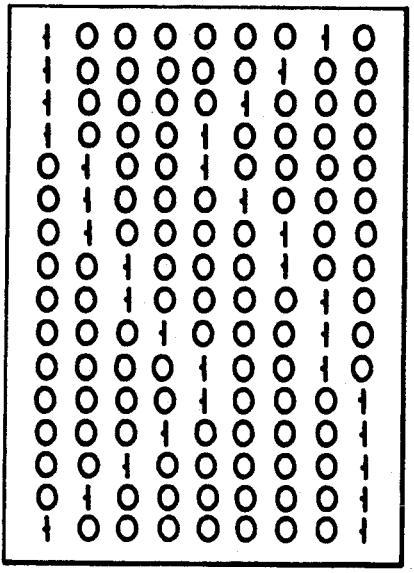
F I G. 46B
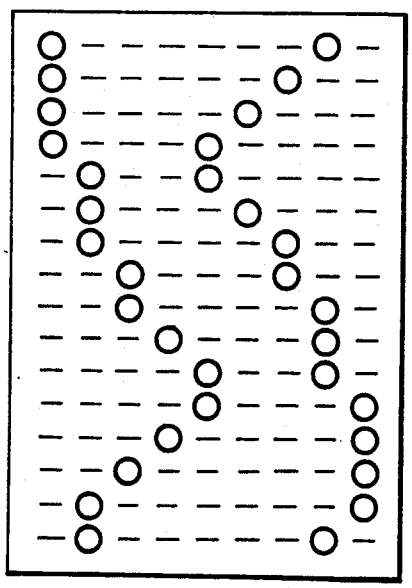
F I G. 47A
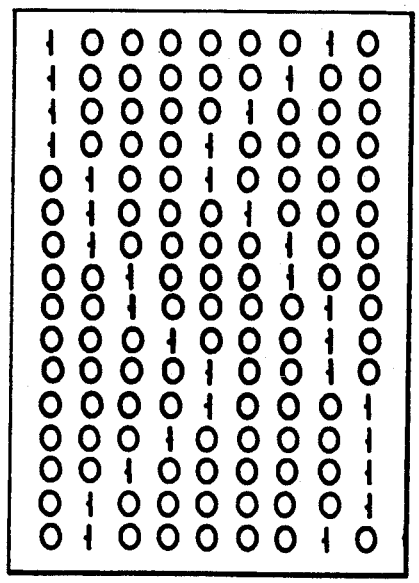
F I G. 47B

METHOD AND APPARATUS FOR DETECTING A TRACK COUNT IN AN OPTICAL DISK APPARATUS FOR RECORDING/REPRODUCING DATA ON/FROM AN OPTICAL DISK

BACKGROUND OF THE INVENTION

1. Field of the Invention

The present invention relates to an optical disk apparatus for recording and reproducing information using a sample servo type optical disk, and an optical disk.

2. Description of the Related Art

A sample servo type optical disk has servo areas intermittently formed on a spiral tracks or concentrical tracks. In a recording/reproduction mode, signals necessary for clock reproduction, tracking, focusing and track accessing are extracted from a detection signal corresponding to the servo pattern.

In general, the servo area has wobbled pits formed on the right and left sides of a track with respect to its center, an access mark, a mirror portion, and a clock pit. The wobbled pits are formed to obtain a tracking error signal, the mirror portions are formed to obtain a focus error signal, and the clock pits are formed to reproduce a system clock in the recording/reproduction mode. The access marks form specific pit patterns which changes in units of tracks to detect the number of tracks (cross track count) which a light spot crosses when the light beam is relatively moved on the optical disk to access a track. In a track access mode, the access mark pattern is reproduced based on a detection signal corresponding to the access mark at every sample timing. The access mark pattern reproduced in synchronism with the present sample timing and the access mark pattern formed in synchronism with the previous sample timing are compared with each other to detect the cross track count between the two sample timings (the present sample period) together with information of a track cross direction. For example, when 16 different access marks are present, a cross track count up to 7 cross tracks can be detected in the direction.

A moving speed of the light spot relative to the optical disk is estimated from the cross track count. The cross track count at every sample timing is added to obtain a total cross track count during access or to measure a moving distance to a target track. In accordance with this measurement value, an aimed track access speed is selected. Thus, various control operations are available.

A track access operation is performed on the basis of data such as the cross track count, the cross direction, the relative moving speed of the light spot, the total cross track count, and the like.

In the track access mode, a detection signal can be obtained not only from tracks but also from a region between adjacent tracks although it has a low level. Since a light spot has a certain spot size, a noise component caused by crosstalk from adjacent tracks is generated in a detection signal from each track. In a track access mode, when a peak position of a detection signal from the access mark is shifted or a phase of a clock signal obtained from the clock pits is disordered due to a detection signal from the region between adjacent tracks or crosstalk of adjacent tracks, the access mark may be erroneously read as a different pattern.

When the access mark is read as a different pattern, it may be read as a pattern which is not present on the optical disk or as other pattern on the optical disk. In the former case, no cross track count data is obtained at all. However, in the latter case, a wrong cross track count is detected as if it were present.

As described above, in the conventional method, especially, when the light spot moves at high speed, the access mark for detecting a cross track count may be erroneously read due to a detected signal from a region between adjacent tracks or crosstalk from adjacent tracks. For this reason, it is difficult to correctly detect a cross track count, and a possibility of obtaining a wrong relative moving speed of a light beam estimated from the cross track count and wrong total cross track count data is increased, resulting in poor reliability of the track access operation.

SUMMARY OF THE INVENTION

It is an object of the present invention to provide an optical disk apparatus which can accurately detect a total cross track count during track access of a sample servo type optical disk even when a read error occurs.

It is another object of the present invention to provide an optical disk apparatus accessing an optical disk, using such access marks that no read error occurs. It is another object of the present invention to provide an optical disk apparatus wherein no track count error occurs even if an error is made in a reading operation.

According to the present invention, there is provided an optical disk apparatus comprising an optical head, driven to cross tracks on an optical disk, for reading an access mark on the present track, access mark discrimination circuit for discriminating whether or not access mark signal read by the optical head is correct, a storage circuit for storing the correct access mark pattern discriminated by the access marks discrimination circuit at least until the next correct access mark pattern is discriminated, and a cross track count detection circuit for comparing the access mark pattern stored in the storage circuit and the correct access mark pattern discriminated by the access mark pattern discrimination circuit to detect the cross track count between these two tracks.

According to the present invention, there is also provided an optical disk apparatus which comprises a discrimination circuit for discriminating the presence/absence of a read error occurring when an access mark formed as a part of a servo pattern on an optical disk is read. When the discrimination circuit discriminates the absence of the read error at a sample timing, a detection result of a cross track count in that sampling period is selected; otherwise, a previous detection result of a cross track count which was discriminated as no read error is selected.

The discrimination circuit discriminates an error by the following method.

The discrimination circuit discriminates the presence/absence of a read error by checking whether or not an access mark pattern reproduced from an access mark coincides with one of a plurality of preregistered patterns which are estimated from specifications of an optical disk to be used.

The discrimination circuit discriminates the presence/absence of a read error by checking whether or not a cross track count detected by a cross track count detection circuit falls within a predetermined range estimated from, e.g., mechanical and electrical characteristics of the optical disk apparatus.

The discrimination circuit discriminates the presence/absence of a read error by checking whether or not a difference between a cross track count detected by a cross track count detection circuit in the present sample timing and a cross track count in the previous sample timing falls within a predetermined range estimated from, e.g., mechanical and electrical characteristics of the optical disk apparatus.

The presence/absence of a read error is discriminated by detecting whether a relative moving direction of a light spot on the optical disk is a direction to be controlled, i.e., whether the relative moving direction is a direction along which the light spot is supposed to travel or a direction opposite to it.

An optical disk apparatus of the present invention detects a cross track count using a detection signal obtained from an entire access mark, having a portion which changes every track or every plurality of tracks, for detecting the cross track count, by a first cross track count detector when the light spot moves at low speed, and detects a cross track count using a detection signal obtained from a portion which changes every plurality of tracks of the specific pit pattern for detecting the cross track count by a second cross track count detector when the light spot moves at high speed.

In an optical disk of the present invention, access marks formed to detect a cross track count on tracks is constituted by two groups of pits. The first group has a pattern which changes every track. In the second group, a pit is formed at the same channel bit position on tracks over at least two adjacent tracks, and is preferably separated from other pits on the same track and pits at different positions on the adjacent tracks by a distance corresponding to three or more channel bits.

According to the apparatus described above, when the light spot moves at high speed, a cross track count is detected by a detection signal from a portion which changes every plurality of tracks of access marks on tracks of an optical disk, i.e., a portion in which a change in pattern in units of tracks is relatively small. In this case, although the detected cross track count has low precision, a possibility of erroneously reading access marks is low even if the light spot moves at high speed.

When the light spot moves at low speed, a cross track count is detected by a detection signal from the entire access marks in the same manner as in the conventional method. Since a light beam is relatively moved at low speed, access marks will not be erroneously read, and a cross track count can be obtained correctly.

According to the present invention, there is also provided a disk apparatus comprising an initial pattern storage circuit for storing an access mark pattern for a track at an initial position read at the beginning of access, a remainder track count detection circuit for comparing the access mark pattern on the track at the initial position stored in the initial pattern storage circuit and an access mark pattern on a track at the present position read during access to detect a residual track count which is the remainder when the track count between the initial position track and the present track is divided by the predetermined number, a cross set counter for counting a cross track set count, i.e., the number of track sets crossed by a light beam during access, and a track count calculation circuit for adding a value obtained by multiplying the predetermined track count with the cross track set count obtained by the cross set counter to the residual track count to obtain a track count between the tracks at the initial position and the present position.

More preferably, according to the present invention, there is provided an optical disk apparatus comprising a read error discrimination circuit for discriminating the presence/absence of a read error of an access mark pattern at every sample timing, a cross track count detection circuit for comparing the read access mark pattern and the access mark pattern read at the previous sample timing at each sample timing when the discrimination circuits discriminates the absence of the read error and for detecting a cross track count of tracks crossed by a light spot between the two sample timings, a cross track count storage for storing the cross track count detected by the cross track count detection circuit, a cross track count accumulation circuit for, when the presence of the read error is discriminated, accumulating the cross track counts stored in the cross track count storage by the number of continuously occurring read errors, and an output circuit for, when the absence of the read error is discriminated, outputting the calculation result of the track count calculation circuit, and for, when the presence of the read error is discriminated, outputting a sum of the calculation result and the accumulation result of the cross track count accumulation circuit.

In this case, when the absence of the read error is discriminated, the cross set counter preferably monitors a detection result of the residual track count detection circuit to check whether or not a light spot crosses a set. When the presence of the read error is discriminated, the counter monitors the output result of the output circuit to check if the light spot crosses the set. Upon detection of each crossing, the counter is counted up.

Furthermore, according to the present invention, there is provided an optical disk apparatus which comprises a fetching position control circuit for detecting a change direction and a change amount of data corresponding to a reference pit formed at a predetermined position on at least one of front and back portions of an access mark in a track direction from read data of a servo pattern on an optical disk, and changing a fetching position of data of the access marks in accordance with the detection results.

According to the present invention, there is provided an optical disk apparatus in which the number of pits and a pit interval are changed in such a manner that the presence/absence of one pit is reversed in a radial direction of an optical disk, thereby distinguishing each pit pattern from other pit patterns.

According to the present invention, there is provided an optical disk in which an interval between pits forming an access mark corresponds to at least three channel bits.

According to the present invention, there is provided an optical disk in which pit patterns on adjacent tracks are synthesized, and an interval between pits in the synthesized pit pattern corresponds to at least three channel bits.

According to the present invention, there is provided an optical disk in which the same access mark having unit patterns which differ every track is repetitively provided on a servo region in units of a predetermined number of tracks, wherein a unit pattern on each track is constituted by two pits, and when a shortest interpit space between the two pits is represented by S, a pattern length of the access mark is represented by PL, a maximum change width of one pit is represented by D, and a repetition cycle of the access mark is represented by F (tracks), F unit patterns, selected from PN unit patterns, of the access mark are arranged so that the position of one pit of each unit pattern is changed by one channel bit between adjacent tracks so as to satisfy the following relations:

$$D = PL - (S + 1)$$

$$F \leq \{(D + 1)(D - 1) + 1\}/2$$

(D: even number)

or $$F \leq (D + 1)(D - 1)/2$$

(D: odd number)

$$PN = \frac{D(D + 1)}{2} - 2$$

According to the optical disk described above, the repetition cycle F (tracks) of the access mark is selected to be a power of 2 since signal processing of the optical disk apparatus is realized by digital processing based on binary notation, and a maximum discrimination speed obtained when a relative moving direction of a light beam is discriminated by reading the access mark is selected to be a value having a sufficient margin with respect to an average seek time. According to the value F, the maximum change width D of one of two pits constituting each unit pattern of the access mark is determined. Furthermore, the number PN of unit patterns of the access mark, which can be used, is obtained. When the shortest interpit space S of two pits constituting the unit pattern of the access mark is determined, the pattern length PL of the access mark can be determined from the value D.

The access marks set in this manner have the access mark relationship on adjacent tracks although they have a minimum pattern length. Therefore, an occupation capacity of the servo byte can be decreased, and a storage capacity of data can be increased. In addition, detection errors of a cross track count, and a relative moving direction and speed of a light beam caused by the influence of jitter or peak shift can be eliminated, thus allowing a highly reliable access operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram of a cross track count detector of the optical disk apparatus of the present invention;

FIG. 5 is a circuit diagram of a binarizing/shaping circuit in FIG. 3;

FIG. 6 is a timing chart for explaining the operation of the circuit shown in FIG. 5;

FIG. 8 is a block diagram of a cross track count detector of an optical disk apparatus according to another embodiment of the present invention;

FIG. 10 is a block diagram of a cross track count detector of an optical disk apparatus according to still another embodiment of the present invention;

FIGS. 12A and 12B show a block diagram of an optical disk apparatus according to still another embodiment of the present invention and a flowchart therefor;

FIG. 13 is a block diagram of an optical disk apparatus according to still another embodiment of the present invention;

FIG. 16 is a circuit diagram of principal parts of the circuit shown in FIG. 15;

FIGS. 36A to 49B are views showing various access mark sets and binary codes obtained by reading the corresponding access marks.

DETAILED DESCRIPTION OF THE PREFERRED EMBODIMENTS

Figure 1:
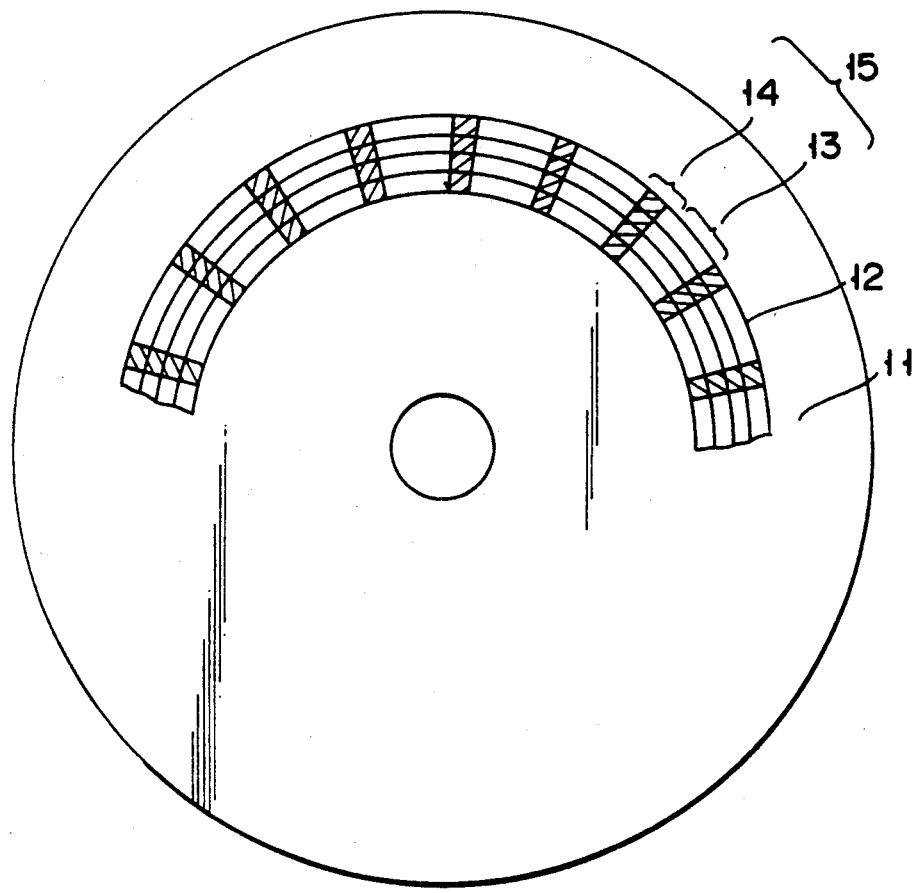
FIG. 1 is a plan view of a sample servo type optical disk used in an optical disk apparatus according to the present invention.

FIG. 1 shows a format of an optical disk 11. Referring to FIG. 1, concentrical tracks or a spiral track 12 is formed on the optical disk 11. Data areas 13 and servo areas 14 for storing servo data for discrete control are alternately formed on each track 12. One data area 13 and one servo area 14 form a segment 15, and a predetermined number of segments 15 are formed on each track at specific intervals.

Figure 2:
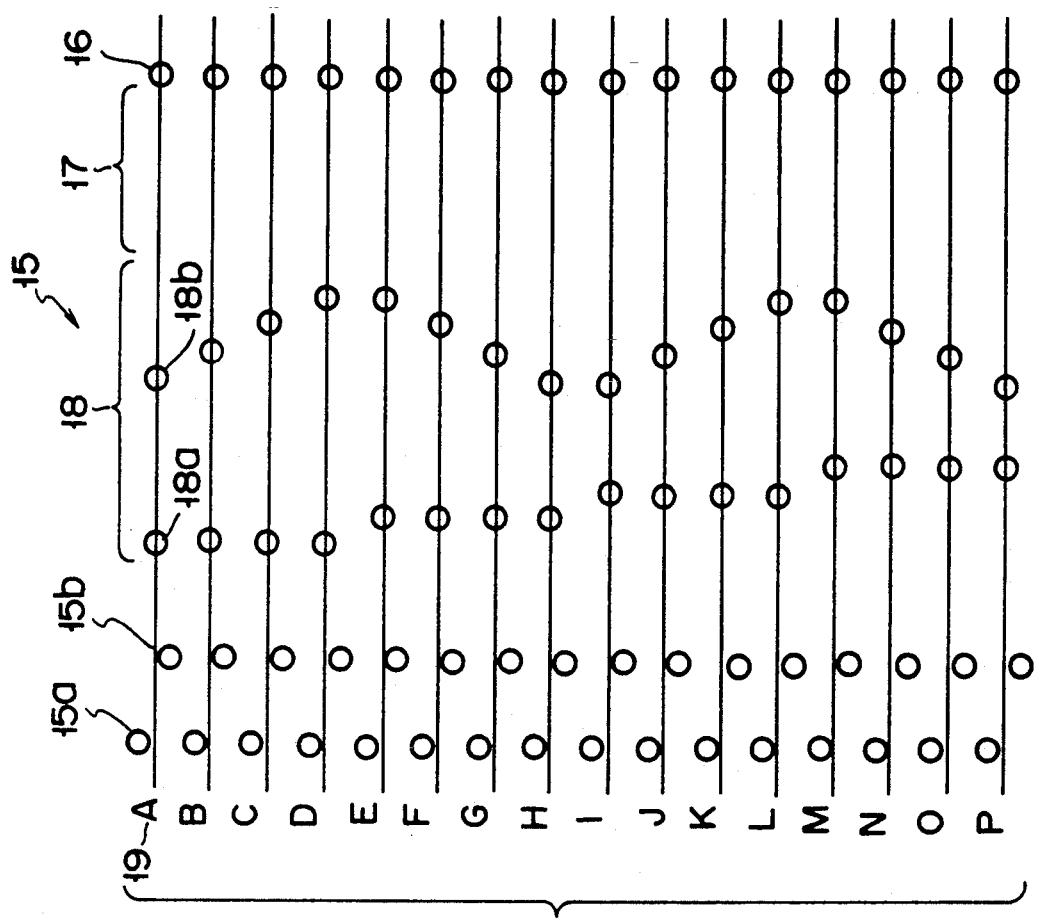
FIG. 2 shows a servo pattern on the sample servo type optical disk.

Each servo area 14 is constituted by two wobbling pits 15a and 15b, a clock pit 16, a mirror portion 17 with no data, and an access mark 18 consisting of a plurality of recording signals, as shown in FIG. 2. The wobbled pits 15a and 15b are formed at a given interval on two sides of a track center 19 to be separated from the track center 19 by the same distance. The wobbled pits are scanned by a light spot while the disk is rotated, light reflected by the pits is detected by a photosensor, and tracking control is performed based on the detection signal. More specifically, the wobbled pits are formed for tracking control.

Each clock pit 16 is formed on the track center 19. A light spot is led on the clock pit 16, and light reflected by the pit is detected by the photosensor to determine a system clock for the servo area. More specifically, the clock pit 16 is used to generate a system clock.

The mirror portion 17 indicates a region on a track having no pit. Light reflected by the mirror portion is detected by the photosensor, and the detected signal is used in focusing control. More specifically, the mirror portion 17 is formed for focusing control.

One access mark 18 is constituted by a pit train of, e.g., two pits 18a and 18b formed in a predetermined region on a track. The positions of the two pits of the pit train vary depending on tracks. In this embodiment, 16 different pit patterns are repetitively formed, as indicated by A to P. 16 access marks form one set. The access marks 18 are used for detecting a total cross track count the track access mode.

When the light spot from the optical head passes through the servo areas, the control signals are generated discretely from the servo areas. Therefore this servo method is called the sample servo.

Referring to FIG. 3, an apparatus for obtaining a total cross track count based on data read out from the optical disk 11 will be described below.

When a clock pit in a servo area of the optical disk 11 is read by an optical head 20, the read signal, i.e., the clock pit signal is supplied to a clock generator 21. The clock generator 21 outputs a system clock to a binarizing/shaping circuit 22, a memory 24, and a cross track count detector 25.

The binarizing/shaping circuit 22 receives an analog signal read from the servo region. The binarizing/shaping circuit 22 shapes the analog signal into a binary signal, and outputs the shaped signal to the memory 24 and cross track count detector 25. The memory 24 receives the output from the binarizing/shaping circuit 22, and stores the pattern of the portion corresponding to the access mark in accordance with the signal output from a read error discrimination circuit 33 (described hereinafter). The cross track count detector 25 can receive the outputs from both the binarizing/shaping circuit 22 and the position detector 23, and calculates the cross track count by comparing the patterns of two access marks.

Figure 4:
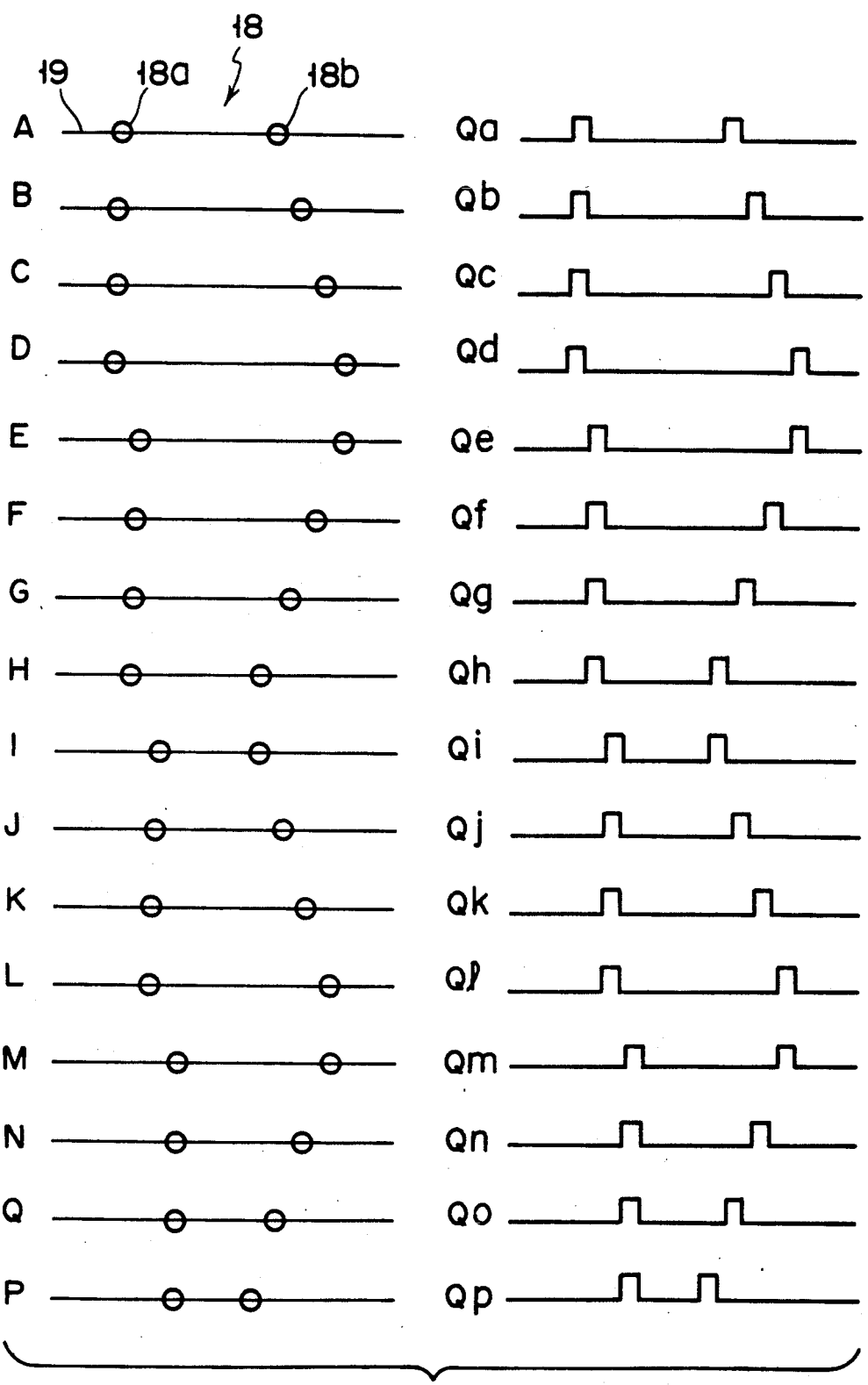
FIG. 4 shows signal patterns corresponding to access marks.

The binarizing/shaping circuit 22 will be described in detail below with reference to FIGS. 5 and 6. An access mark signal (1) supplied to the binarizing/shaping circuit 22 is input to a comparator 26, and is shaped to a binary signal (2). The binary signal is output to a data flip-flop 27. A clock signal (3) is input to the data flip-flop 27 and a delay circuit 28. The data flip-flop 27 outputs a flip-flop signal (4) in response to the binary signal (2) and the clock signal (3). The delay circuit 28 outputs a signal (5) obtained by delaying the clock signal by a predetermined period of time. Output signals (4) and (5) of the data flip-flop 27 and the delay circuit 28 are input to an AND gate 29, and are logically ANDed, thus outputting a final binary signal (6). As described above, the binary signals such as Qa-Qp are obtained from the access marks A-P shown in FIG. 4.

These 16 binary signal patterns are registered to be used for descriminating whether the access mark is correctly read or not by checking whether or not the read access mark pattern coincides with one of the registered patterns.

There will now be described how to obtain a cross track count hereinafter.

The light spot from the optical head is moved on the rotating optical disk in the radial direction thereof. In this time, for example, the access mark B (FIG. 2) is correctly read from the optical disk at a certain sample timing and stored in the memory 24, and at a next sample timing the access mark D is correctly read. When the access marks B and D are transferred to the cross track count detector, this detector compares them, to detect the advance of two tracks, in this sample period.

According to the above method, when the access marks (having 16 patterns) shown in FIG. 2 are used, the cross track count can be detected up to ±7. By adding the cross track count at every sample timing in an adder (not shown), a total track count from the access start to the present time can be measured.

The read error discrimination circuit 33 determines whether the access mark is correctly read or not. When the read error discrimination circuit 33 detects the fact that the access mark is correctly read, the memory 24 stores the pattern of the access mark output from the binarizing/shaping circuit 22. On the other hand, if the read error discrimination circuit 33 detects the read error, the memory 24 does not store newly the pattern of the access mark but holds the previous pattern up until the access mark is correctly read.

When the access mark is correctly read at first after the read error occurred, the cross track count detector 25 compares two patterns output from the memory 24 and binarizing/shaping circuit 22, to detect the cross track count including the cross track count during the read error.

Figure 7:
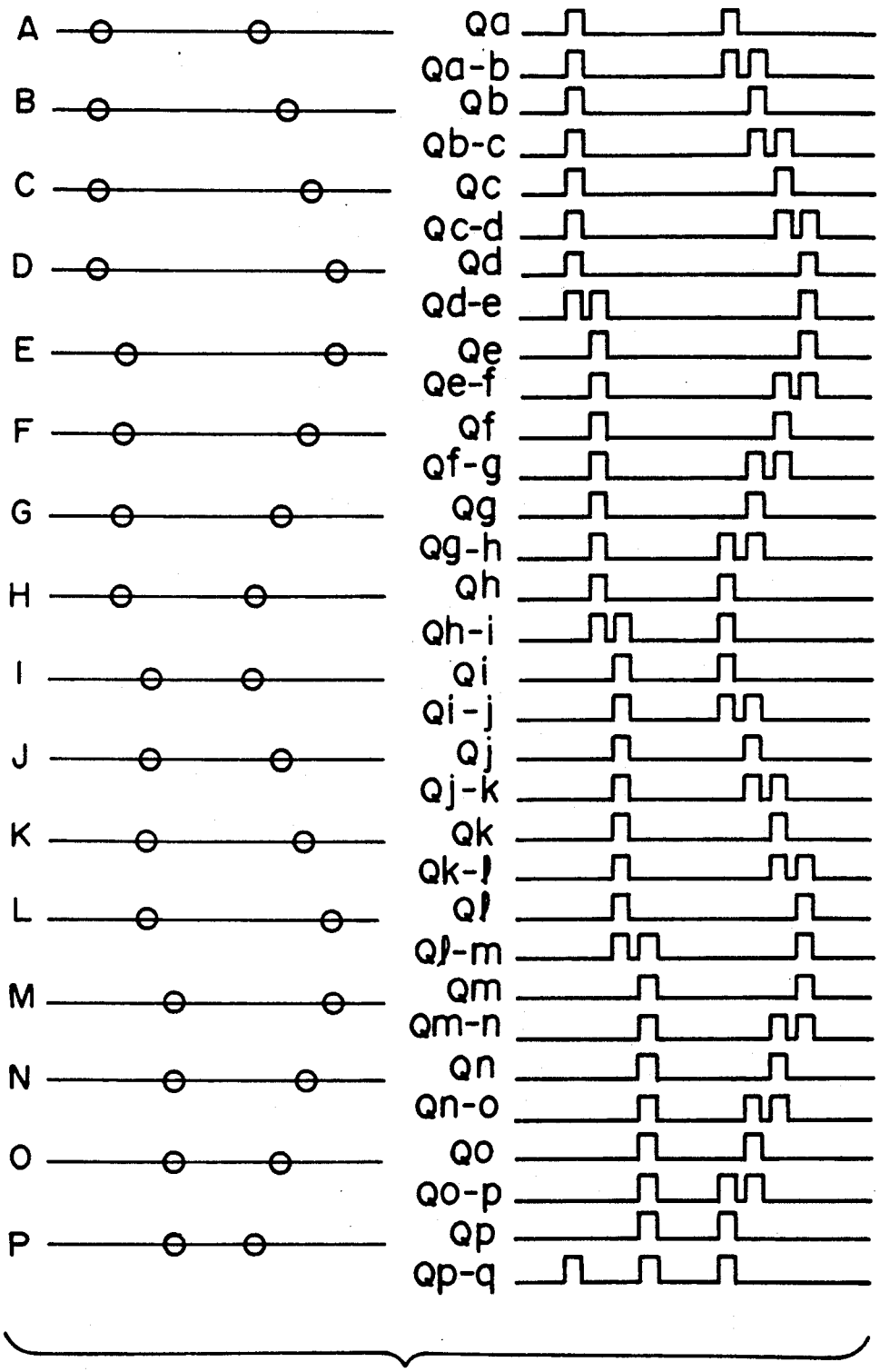
FIG. 7 shows other signal patterns corresponding to access marks.

The adder above described adds the cross track count only when no read error occurs. The correct cross track count can be detected even if the read error occurs. The patterns may be signal patterns shown in FIG. 7.

With these patterns, a total of 32 different patterns including synthesized patterns of adjacent access marks (e.g., Qa-b) are set, and are used to discriminate the read error. When these patterns are used, position control of the light spot position can be more precisely performed.

Another embodiment of the present invention will be described below with reference to FIG. 8.

According to this embodiment, a detection signal output from an optical head 20 is input to a clock reproduction circuit 21 and a binarizing/shaping circuit 22. A clock signal obtained by the clock reproduction circuit 21 is input to a timing generator 31 and the binarizing/shaping circuit 22. The clock reproduction circuit 21 extracts a signal corresponding to the clock pit 16 shown in FIG. 2, and waveshapes it to reproduce the system clock. The timing generator 31 generates various timing signals required in respective sections in FIG. 8 on the basis of the system clock.

The binarizing/shaping circuit 22 binarizes the detection signal as an analog signal output from the optical head 20, and shapes the binary signal into a rectangular wave by using the system clock. The binarizing/shaping circuit 22 has the circuit arrangement shown in FIG. 5.

The output signal from the binarizing/shaping circuit 22 is input to a cross track count detector 25 and a memory 24. The memory 24 stores a pattern (binary shaped data) of the detection signal detected from the access mark 18 at a previous sample timing. In this case, the cross track count detector 25 detects the cross track count, comparing the pattern of the detection signal from the access mark at the present sample timing with that at the previous sample timing.

A selector 32 selectively outputs the output signal from the cross track count detector 25 which is obtained at the present sample timing and the output signal from a latch 34 for latching an output signal value which is obtained at the previous sample timing of the selector 32 in accordance with a discrimination result of a read error discrimination circuit 33.

The read error discrimination circuit 33 is a circuit for discriminating the presence/absence of a read error in an access mark pattern on the basis of the output signal from the binarizing/shaping circuit 22, the output signal from the cross track count detector 25, and the output signal from the latch 34. The read error discrimination circuit 33 outputs an error discrimination signal of binary level "1" or "0" according to the presence/absence of the read error. When the read error discrimination circuit 33 discriminates the absence of the read error, the selector 32 selects the output signal from the cross track count detector 25, i.e., a cross track count detection result at the present sample timing (represented by Sy) in accordance with the error discrimination signal. When the discrimination circuit 33 discriminates the presence of the read error, the selector 32 selects the output signal from the latch 34, i.e., the cross track count detection result at a previous sample timing Sy-n (n is a positive integer) at which the absence of the read error was discriminated. The cross track count detection signal 14 obtained in this manner are supplied to an adder (not shown) and added every sample timing, thereby obtaining a total cross track count from an access start.

Figure 9:
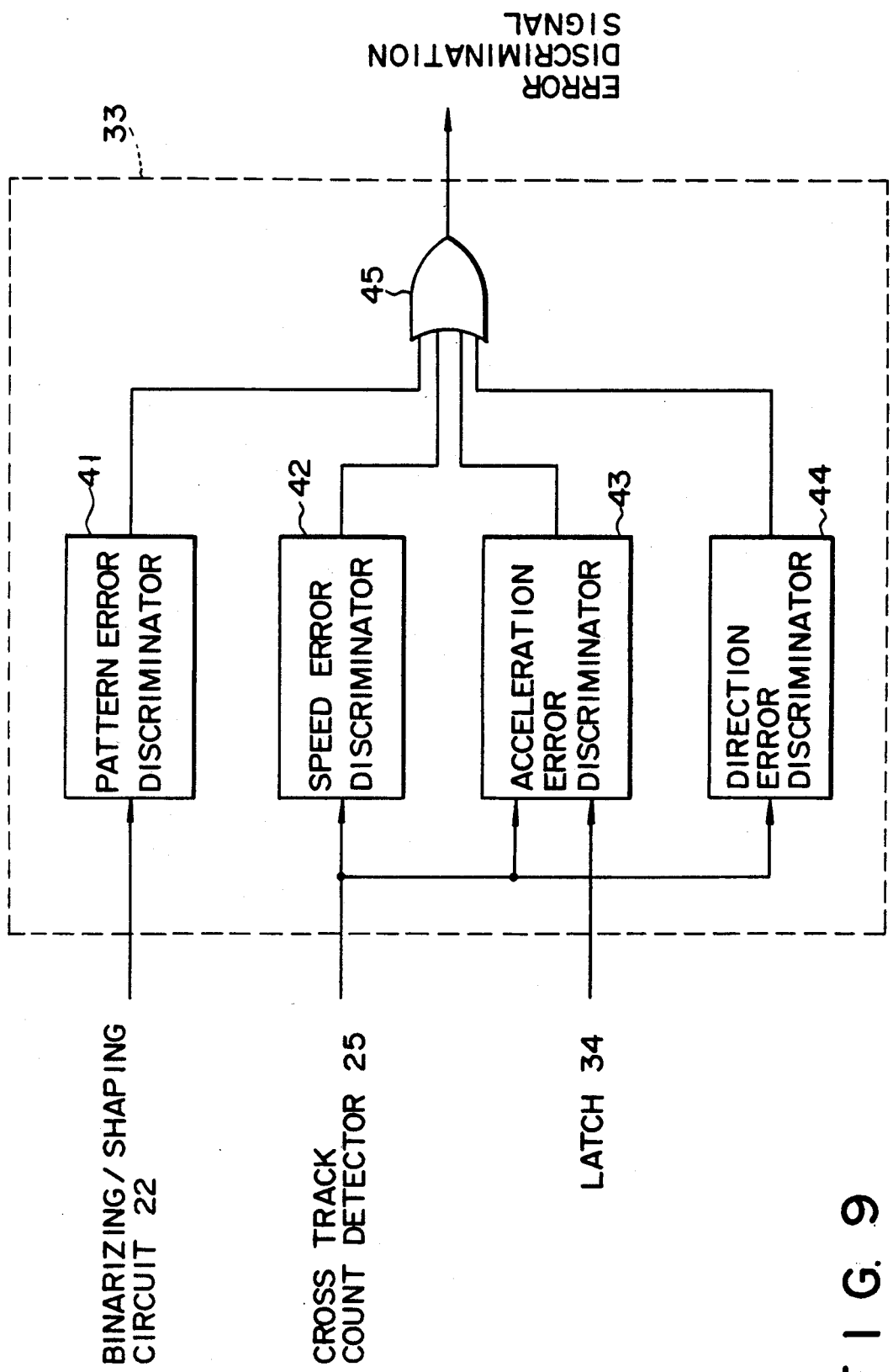
FIG. 9 is a block diagram of a read error discrimination circuit.

The read error discrimination circuit 33 will be described in detail below with reference to FIG. 9.

The read error discrimination circuit 33 comprises a pattern error discriminator 31, a speed error discriminator 42, an acceleration error discriminator 43, and a direction error discriminator 44.

The pattern error discriminator 41 checks whether or not a read pattern of a certain access mark is a possible pattern, thereby discriminating the presence/absence of a read error.

More specifically, the discriminator 41 registers all the plurality of patterns of access marks on an optical disk to be used in advance in the memory, and checks if the read pattern coincides with one of the registered patterns. If a pattern coinciding with the read pattern is found, the discriminator discriminates the absence of a read error; otherwise, it discriminates the presence of a read error. The pattern error discriminator 41 can comprise, e.g., a ROM. More specifically, an access mark pattern in the output signal of the binarizing/shaping circuit 22 is supplied to the ROM as an address input, data indicating the absence of a read error, e.g., "0" is read out from an address corresponding to the registered patterns, and data indicating the presence of a read error, e.g., "1" is read out from an address corresponding to a non-registered pattern.

The speed error discriminator 42 checks if a cross track count (corresponding to a moving speed of a light spot relative to the optical disk 11) detected by the cross track count detector 25 falls within a cross track count range estimated from, e.g., mechanical and electrical characteristics of the optical disk apparatus, thereby discriminating the presence/absence of a speed error. In this manner, the discriminator 42 discriminates the presence/absence of a read error.

More specifically, a maximum cross track count, i.e., a maximum number of tracks which can be crossed during one sample period on the basis of a maximum relative moving speed obtained in consideration of mechanical and electrical characteristics of the optical disk apparatus is stored in the discriminator 42. When the cross track count detected by the cross track count detector 25 is equal to or smaller than the maximum track count, the discriminator 42 discriminates the absence of a read error, and outputs, e.g., "0"; otherwise, it discriminates the presence of a read error, in other words, the presence of a speed error, and outputs "1".

The acceleration error discriminator 43 checks if an acceleration when a light spot is moved relative to the optical disk 11, i.e., a difference between a cross track count at the present sample timing detected by the cross track count detector 25 and a cross track count held in the latch 34 (a value considered as a cross track count at the previous sample timing) falls within a predetermined range estimated from, e.g., the mechanical and electrical characteristics of the optical disk apparatus, thereby discriminating the presence/absence of a read error.

More specifically, a maximum track count (maximum change amount) which can be changed during one sampling period on the basis of a maximum acceleration obtained in consideration of mechanical and electrical characteristics of the optical disk apparatus is stored in the discriminator 43. When a difference between the cross track count at the present sample timing and the cross track count at the immediately preceding sample timing is equal to smaller than the stored maximum change amount, the discriminator 43 discriminates the absence of a read error, and outputs "0"; otherwise, it discriminates the presence of a read error, i.e., an acceleration error, and outputs "1".

The direction error discriminator 44 detects if a moving direction of a light spot relative to the optical disk 11 is an aimed direction to be controlled, i.e., a direction along which a light beam should propagate or an opposite direction, thereby discriminating the presence/absence of a read error. More specifically, when the relative moving direction is the direction to be controlled, the discriminator discriminates the absence of a read error, and outputs "0"; otherwise, it discriminates the presence of a read error, i.e., a direction error, and outputs "1".

The output signals from the pattern error discriminator 41, the speed error discriminator 42, the acceleration error discriminator 43, and the direction error discriminator 44 are input to an OR gate 45, and the output signal from the OR gate 45 serves as a final error discrimination signal output from the error discrimination circuit 33.

The error discrimination signal is supplied to the selector 32. When the error discrimination signal is "0", the selector 32 selects the output signal from the cross track count detector 25; when the error discrimination signal is "1", i.e., when at least one of the pattern error discriminator 41, the speed error discriminator 42, the acceleration error discriminator 43, and the direction error discriminator 44 discriminates the presence of an error, it selects the output signal from the latch 34, and outputs this signal as the cross track count detection signal.

When a read error is detected in this manner, the latest cross track count detection result of the output signals of the latch 34 which were discriminated to have no read error is selected, and is output as the cross track count detection signal. Thus, the cross track count detection signal never has an abnormal value caused by the read error, and a track access operation can be normally performed.

Especially, in this embodiment, a read error caused by errors of a speed (maximum speed), an acceleration, and a moving direction during relative movement of a light beam on the optical disk 11 is discriminated in addition to discrimination of the access mark, resulting in very high reliability of error discrimination.

In this embodiment, four types of circuits, i.e., the read error discriminator 41, the speed error discriminator 42, the acceleration error discriminator 43, and the direction error discriminator 44 are used as a read error discrimination means. However, all these circuits need not always be arranged. If some of these circuits are arranged, a certain effect can be obtained. Therefore, these circuits can be appropriately selected in consideration of a purpose of use and an environment of an apparatus, nature and characteristics of an optical disk, and the like.

Still another embodiment of the present invention will be described below with reference to FIG. 10.

According to this embodiment, a detection signal output from an optical head 20 is input to a clock reproduction circuit 21 and a binarizing/shaping circuit 22. A clock signal obtained by the clock reproduction circuit 21 is input to a timing generator 31 and the binarizing/shaping circuit 22. The clock reproduction circuit 21 extracts a signal corresponding to the clock pit 16 shown in FIG. 2, and waveshapes it to reproduce the system clock. The timing generator 31 generates various timing signals required in respective sections in FIG. 10 on the basis of the system clock.

The binarizing/shaping circuit 2 binarizes the detection signal as an analog signal output from the optical pickup 20, and shapes the binary signal into a rectangular wave by using the system clock. The binarizing/shaping circuit 22 has the circuit arrangement shown in FIG. 5.

The output signal from the binarizing/shaping circuit 22 is input to first and second cross track count detectors 25-1 and 25-2, and memories 24-1 and 24-2. The first cross track count detector 25-1 detects a cross track count on the basis of detection signals from both the entire access mark 18, i.e., a portion which changes every track (the right pit 18b of the access mark 18) and a portion which changes every plurality of tracks (the left pit 18a of the access mark 18).

Meanwhile, the second cross track count detector 25-2 detects a cross track count on the basis of only a detection signal from a portion which changes every plurality of tracks of the access mark 18, i.e., from the left pit 18a of the access mark 18.

The memories 24-1 and 24-2 store detection signal patterns (binary shaped data) from the access mark 18 at the previous sample timing required in the cross track count detectors 25-1 and 25-2, and comprise, e.g., shift registers. The memories 24-1 and 24-2 may store all the detection signal patterns from the access mark 18. In this case, one memory can be commonly used as the detection signal pattern only from the right pit 18b of the access mark 18.

A selector 52 selects the detection result of the first cross track count detector 25-1 in response to a track access mode switching signal in a low-speed track access mode, and selects the detection result of the second cross track count detector 25-2 in a high-speed track access mode, thus outputting a cross track signal.

A read error discrimination circuit is a circuit for discriminating the presence/absence of a read error in an access mark pattern output from the binarizing/shaping circuit 22.

The cross track count detection signal and the error discrimination signal are supplied to a track access controller (not shown).

The first and second cross track count detectors 25-1 and 25-2 respectively compare a detection signal pattern from the entire access mark 18 and a detection signal pattern from only the left pit 18a with the patterns stored in the memories 24-1 and 24-2, thus detecting cross track counts. As shown in FIG. 2, since the right pit 18b of the access mark 18 changes every track, the first cross track count detector 25-1 can identify each track 12. However, since the left pit 18a changes every four tracks, the second cross track count detector 25-2 can only identify every four tracks 12.

For example, at certain successive sample timings Sx, Sx+1, Sx+2, and Sx+3, a light spot is relatively moved on the optical disk 11 like track A→C→F→I, in FIG. 2. At this time, paying attention to the left pits 18a of the access marks 18, since the pits 18a are present at the same positions on the tracks A and C, it can be expected that the light spot advances by $-3$ to $+3$ 20 tracks between the sample timings Sx and Sx+1. In this case, it can also be expected that the light spot jumps, e.g., 16 access marks, and advances by $+13$ to $+19$ tracks or $-13$ to $-19$ tracks. In consideration of a maximum speed of a movable portion based on a mass, maximum acceleration, friction, and maximum acceleration time of the movable portion of the optical head 20, a possibility of such a jump can be decided. In general, the specifications of the access marks 18 are set to inhibit such a jump, and such situation will not be taken into consideration.

On the track F at the sample timing Sx+2, since the pit 18a is located at a position different from those at the sample timings Sx and Sx+1, it can be expected that the light beam advances by one to seven tracks between the sample timings Sx+1 and Sx+2. The same applies to an interval between the sample timings Sx+2 and Sx+3.

The second cross track count detector 25-2 detects a cross track count between sample timings based on these data as follows. A position change in pattern of the left pit 18a of the access mark 18 corresponds to an average value of an expected cross track count. For example, when the first cross track count detector 25-1 successively detects pits 18a of the same pattern, zero track as an average value of expected cross track counts −3 to +3 is set as a cross track count, or one or two tracks in a track access direction is set as a cross track count in consideration of the high-speed track access mode. When the pattern of the pit 18a is changed to an adjacent pattern (e.g., from the pattern on the tracks A to D to the pattern on the tracks E to H or to the pattern on the tracks M to P), +4 or −4 tracks are set as a cross track count.

In the high-speed access mode, the cross track count obtained in the second cross track count detector 25-2 and estimated at each sample timing is input to a track access controller 53 through the selector 52 as a cross track count detection signal. The track access controller 53 adds the cross track counts obtained by the second cross track count detector 25-2 to roughly obtain the present position of a light spot relative to the optical disk 11. The track access controller 53 calculates a moving speed of a light spot relative to the optical disk 11 based on the cross track count between sample timings, and can generate a feedback signal for track access speed control.

The track access controller 53 performs high-speed track access using data of the relative position and the relative speed obtained in this manner. The track count detection signal used in the high-speed track access mode is obtained based on only the left pit 18a which position does not change so frequently. Therefore, a detected cross track count can be prevented from terribly showing wrong value due to a read error of the gray code pattern unlike in the prior art in which a cross track count detection signal is obtained using a detection signal obtained from the entire access mark 18 including the right pit 18b which changes every track even in the high-speed track access mode.

When a light spot approaches a target track by high-speed track access, the track access operation is switched to a low-speed mode. In the low-speed track access mode, a cross track count detected based on the detection signal obtained from the entire access mark 18 by the first cross track count detector 25-1 is input to the track access controller 53 through the selector 52 as a cross track count detection signal.

In the low-speed track access mode, since the light beam is moved on the optical disk 11 at low speed, the first cross track count detector 25-1 for detecting a cross track count using the detection signal from the entire access mark 18 will not erroneously read the access mark, and can precisely detect the cross track count in units of tracks. Therefore, the track access controller 53 can perform a final guide operation of a light beam to the target track on the basis of the cross track count detected by the first cross track count detector 25-1.

Figure 11:
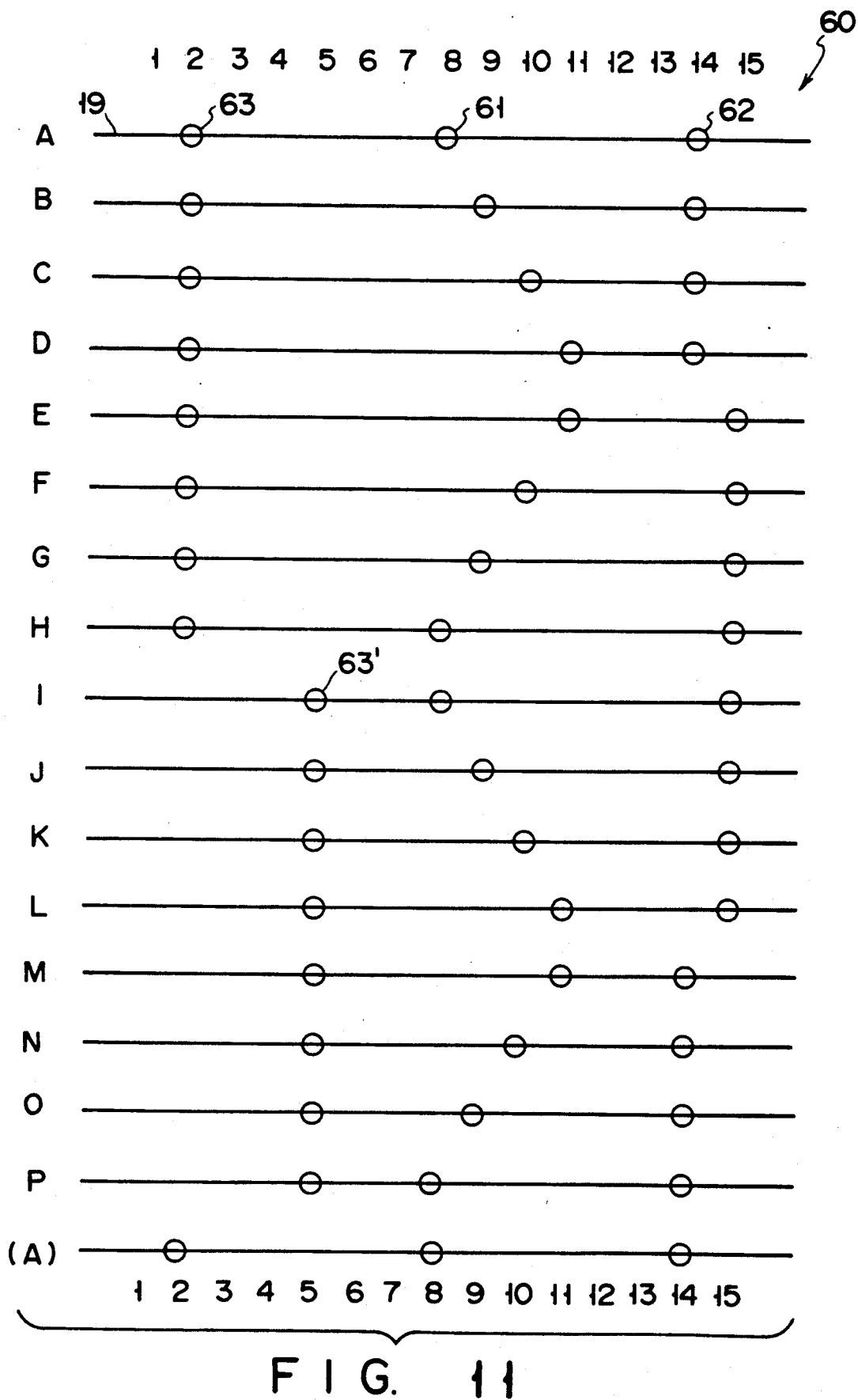
FIG. 11 shows another preferable access mark set formed on an optical disk used in the present invention.

The servo pattern 14 on the optical disk 11 is not limited to one shown in FIG. 2, but may be any other patterns. For example, as shown in FIG. 11, an access mark 60 of the servo pattern consists of three pits 61, 62, and 63 formed on each track 19. Of these three pits 61, 62, and 63, the central and right pits 61 and 62 belong to a first group, and the left pit 63 belongs to a second group. The pits 61 and 62 constituting the first group have a pattern which changes every track.

The pits 63 constituting the second group are formed at the same channel bit positions on tracks over at least two adjacent tracks (in FIG. 11, eight tracks). The pit 63 is separated from other pit 61 on the same track and a pit 63' at a different position on the adjacent track by a distance corresponding to three or more channel bits.

Like in the present invention, when a cross track count is detected using only a detection signal obtained from a portion which changes every plurality of tracks by the second cross track count detector 25-2 in the high-speed track access mode, a decrease in level or a peak shift of a detection signal occurs in an intertrack region. Therefore, when the pattern of the access mark 18 shown in FIG. 2 is used, the left pit 18a may be erroneously recognized as a pit on another track.

In contrast to this, according to the access mark set of FIG. 11 since the pit 63 is separated from other pit 61 on the same track and the pit 63' at a different position on the adjacent track by a distance corresponding to three or more channel bits, the position of the pit 63 can be precisely detected even if the pit 63 is erroneously read at a position separated by about one channel bit due to a peak shift. Therefore, reliability of cross track count detection can be improved.

Still another embodiment of the present invention will be described below with reference to FIGS. 12A and 12B.

The detection signal output from the optical head 20 is input to a clock reproduction circuit 21 and a binarizing/shaping circuit 22 as in the above embodiments. A clock signal obtained by the clock reproduction circuit 21 is input to a timing signal generator 31 and the binarizing/shaping circuit 22. The clock reproduction circuit 21 extracts a signal corresponding to a clock pit 16 (FIG. 2), and waveshapes it to reproduce the system clock. The timing signal generator 31 generates various timing signals required in respective sections of the optical disk apparatus on the basis of this system clock.

The output signal from the binarizing/shaping circuit 22 is input to a pattern number decoder 71. The pattern number decoder 71 detects a pattern of an access mark 18 (FIG. 2) from the output signal of the binarizing/shaping circuit 22, determines one of 16 different patterns which coincides with the detected pattern, and outputs data indicating a pattern number. For example the access mark A is given a pattern number of 0, B a pattern number of 1, C a pattern number of 2 ... and D a pattern number of 15. The pattern number data is input to an initial pattern latch 72 and a residual track count detector 73. The initial pattern latch 72 latches pattern number data obtained at the beginning of access, i.e., data of a pattern number of the access mark 18 on a track at an initial position of the light spot at the beginning of access (to be referred to as an initial pattern number hereinafter).

The residual track count detector 73 compares the initial pattern number data and data of a pattern number of the access mark 18 on a track at the present position of the light spot (to be referred to as a present pattern number hereinafter) obtained from the pattern number decoder 71 at every sample timing during access, and detects a residual track count A.

EXAMPLE 1

If the present pattern number is 8, the initial pattern number is 3 and the seek direction is OUT, then the residual number of tracks is 5.

EXAMPLE 2

If the present pattern number is 11, the initial pattern number is 5 and the seek direction is IN, then the residual number of tracks is 10.

When a track count between tracks at the initial position and the present position is represented by T, the residual track count A is equivalent to the residue when T is divided by a track count n on which a set of access marks are formed. When n=16, the data of the residual track count A is expressed by a 4-bit binary number. If A=0 is expressed by "0000", A=15 is expressed by "1111".

The data of the residual track count A from the residual track count detector 73 is input to a set detector 74. The set detector 74 is a circuit for generating a signal every time a light spot crosses a set of access marks 18. For example, when n=16, $2^3$ bit of data (binary number) of the residual track count A detected by the residual track count detector 73 is checked. Every time this value is inverted from "H" to "L", for example, when data of the residual track count A is changed from "1111" to "0000", the detector 74 determines that a light beam has crossed a set of access marks, and outputs a pulse signal. The pulse signal output from the set detector 74 is input to a cross set counter 75. The content of the cross set counter 75 is incremented every time the pulse signal is input from the set detector 74, and the counter 75 outputs binary data indicating a set count B of access marks detected by a light spot during access (to be referred to as a cross set count B hereinafter).

The output data of the cross set counter 75 is input to a track count calculator 76 together with the output data from the residual track count detector 73. The track count calculator 76 adds the residual track count A and a value n·B obtained by multiplying the cross set count B with the track count n on which a set of access marks are formed, as expressed by an equation below, thus calculating a track count T between tracks at the initial position and the present position. The calculator 76 then outputs data indicating the calculated track count. When n=16, n·B can be obtained by shifting data (binary number) of the cross set count B toward the MSB by four bits. The track count calculator 76 can be realized by a bit shifter and an adder.

$$T = A + n \cdot B$$

The cross set count B is incremented by one every time a light spot crosses a set of access marks, i.e., crosses n tracks. Thus, a possibility of an error is low.

The residual track count A is obtained by comparing the initial pattern number with the present pattern number by the residual track count detector 73, and is updated every sample timing regardless of the present pattern numbers obtained at previous sample timings. More specifically, when a pattern of the access mark 18 is read, even if a read error occurs at a certain sample timing, if a pattern of an access mark portion can be correctly read at the next sample timing, a correct value can be obtained regardless of the presence/absence of a read error at previous sample timings.

FIG. 12B shows the flow chart for the track counting operation described above.

Therefore, according to this embodiment, a track count between tracks at the initial position and the present position can be detected without accumulating detection errors of track counts during access and causing a considerable error, thus obtaining a highly reliable track count detection result.

Still another embodiment of the present invention will be described below with reference to FIG. 13.

Figure 12A:
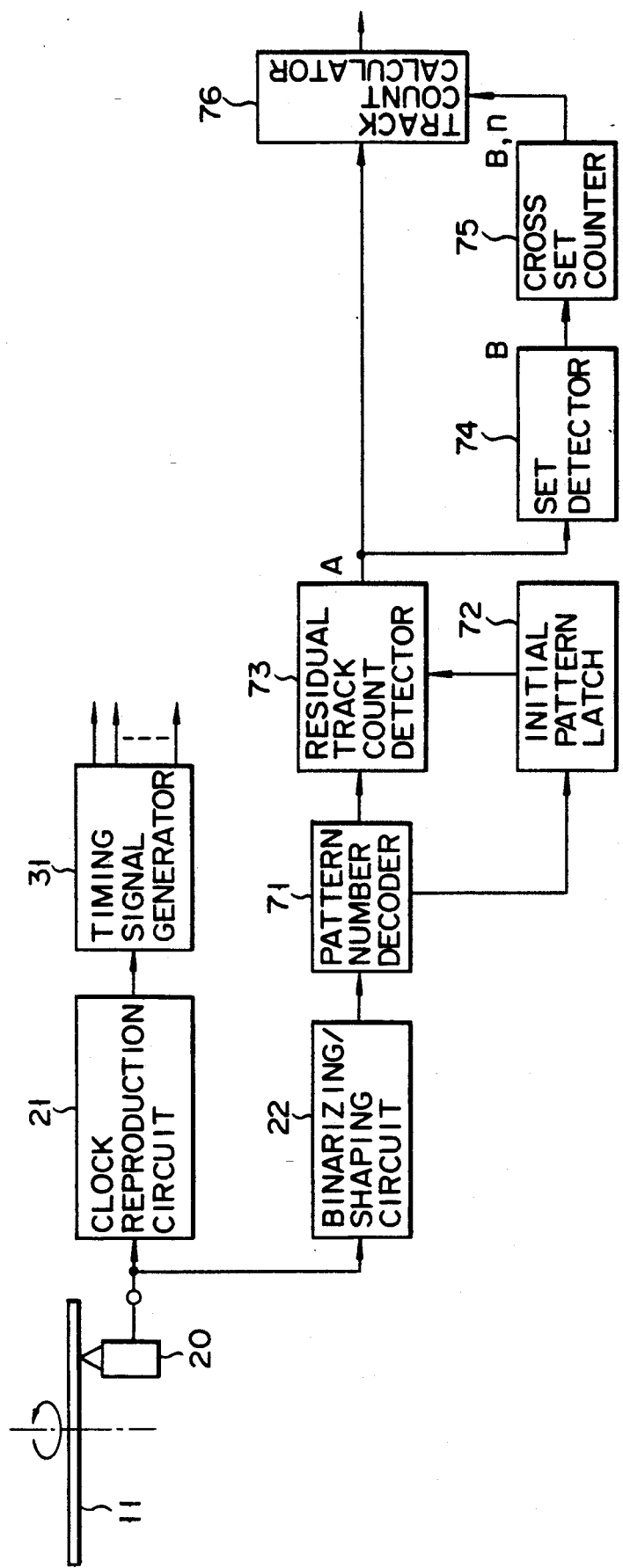

According to the embodiment shown in FIG. 13, a track count latch 77, a previous pattern latch 78, a cross track count detector 79, a cross track count latch 80, a read error discriminator 81, a cross track count accumulator 82, a selector 83, and an adder 84 are added to the embodiment shown in FIG. 12A.

The track count latch 77 latches a track count calculated by a track count calculator 76 when the read error discriminator 81 discriminates the absence of a read error.

The previous pattern latch 78 latches a pattern number from a pattern number decoder 71 until the next pattern number is output. The cross track count detector 79 compares a pattern number at the present sample timing output from the pattern number decoder 71 with a pattern number at a previous sample timing latched by the previous pattern latch 78 to detect a cross track count between the two sample timings. The cross track count latch 80 latches data of a cross track count detected by the cross track count detector 79 when the read error discriminator 81 discriminates the absence of a read error.

The read error discriminator 81 discriminates the presence/absence of a read error of an access mark in the output signal of the binarizing/shaping circuit 22. For example, the discriminator 81 discriminates the presence/absence of a read error by comparing pre-stored patterns with the detected access mark pattern, or on the basis of data such as a cross track count detected by the cross track count detector 79, a cross track count change rate as a difference between this cross track count and a cross track count held in the cross track count latch 80, or the like. For example, when the detected access mark coincides with one of the stored access marks, the discriminator discriminates the absence of a read error; otherwise, it discriminates the presence of a read error.

When the read error discriminator 81 discriminates the presence of a read error, the cross track count accumulator 82 accumulates cross track counts held in the cross track count latch 80 by the number of successively occurring read errors. More specifically, if the number of successively occurring read errors is represented by N and a cross track count is represented by ΔT, the cross track count accumulator 82 generates data given by N·ΔT.

When the read error discriminator 81 discriminates the presence of a read error, the selector 83 outputs the output data of the cross track count accumulator 82; otherwise, it outputs data "0". The output data from the selector 83 is input to the adder 84, and is added to the output data from the track count latch 77.

In this embodiment, when no read error of an access mark is detected, since the output from the selector 83 goes to "0", the total track count data from the track count latch 77 is directly output through the adder 84 as in the embodiment shown in FIG. 12A. On the other hand, when a read error of the access mark is detected, since the output data of the cross track count accumulator 82 is selected by the selector 83, the adder 84 outputs data obtained by adding a cross track count between previous sample timings which is output from the cross track count accumulator 82 when no read error is detected, to a total track count up to a previous sample timing which is held in the track count latch 77. Therefore, even if a read error of the access mark is detected, the total track count data output is free from a large error.

In this embodiment, when a read error of the access mark occurs, the set detector 74 does not execute set detection. Therefore, even when the position of 23 of the residual track count data output from the residual track count detector 73 is erroneously changed from "H" to "L" due to the read error of the access mark, the cross set counter 75 will not erroneously count the cross set count.

Still another embodiment of the present invention will be described below with reference to FIG. 14.

Figure 14:
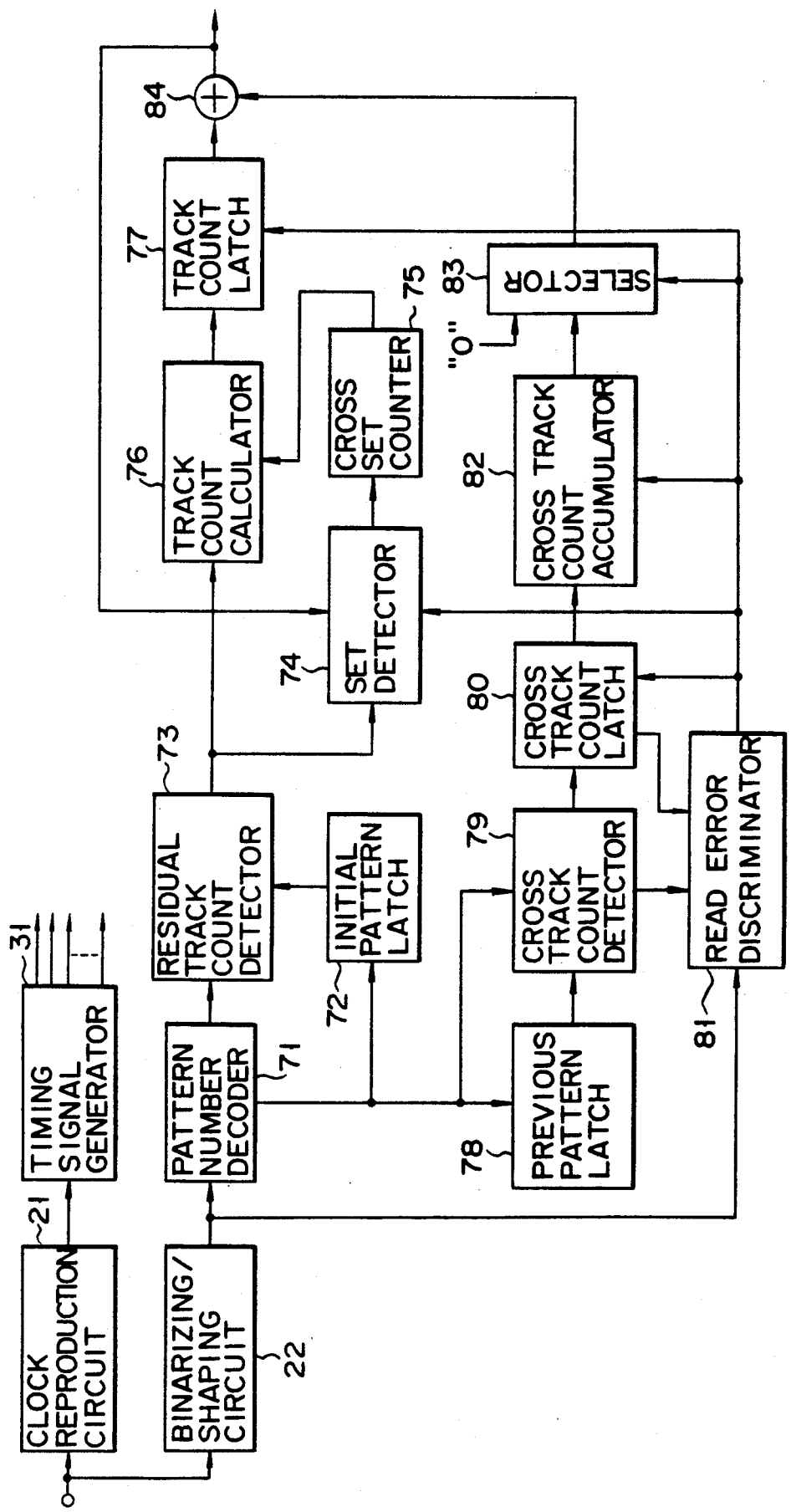
FIG. 14 is a block diagram of an optical disk apparatus according to still another embodiment of the present invention.

A difference between this embodiment and the embodiment shown in FIG. 13 is that cross track count data output from an adder 84 is fed back to a set detector 74 in FIG. 14.

When an access mark read error occurs, the set detector 74 checks the $2^3$ bits of the output data from the adder 64 in place of $2^3$ bits of the residual track count data output from a residual track count detector 73. When the $2^3$ bits of the output data of the adder 84 are changed from "H" to "L" since read errors successively occur, the set detector 74 determines that a light spot crosses a set of access marks 18, and sends a one-shot pulse signal to a cross set counter 75 to increment the content of the counter 75. According to this embodiment, even when a read error of the access mark continues over a plurality of sample timings, a cross set count can be correctly counted.

More specifically, when a light beam advances by 8 or more tracks during one or a plurality of successive read errors, the $2^3$ bit of the residual track count data output from the residual track count detector 73 are held at "H" or "L". Even if a light spot advances by 16 or more tracks after a certain set is detected, no set detection is executed, and a wrong cross set count may be obtained. In this case, in this embodiment, since the set detector 74 executes set detection by utilizing the fact that the output data from the adder 84 is increased upon accumulation of a cross track count, no wrong set count is obtained. As a result, reliability of set count detection can be further improved.

Figure 15:
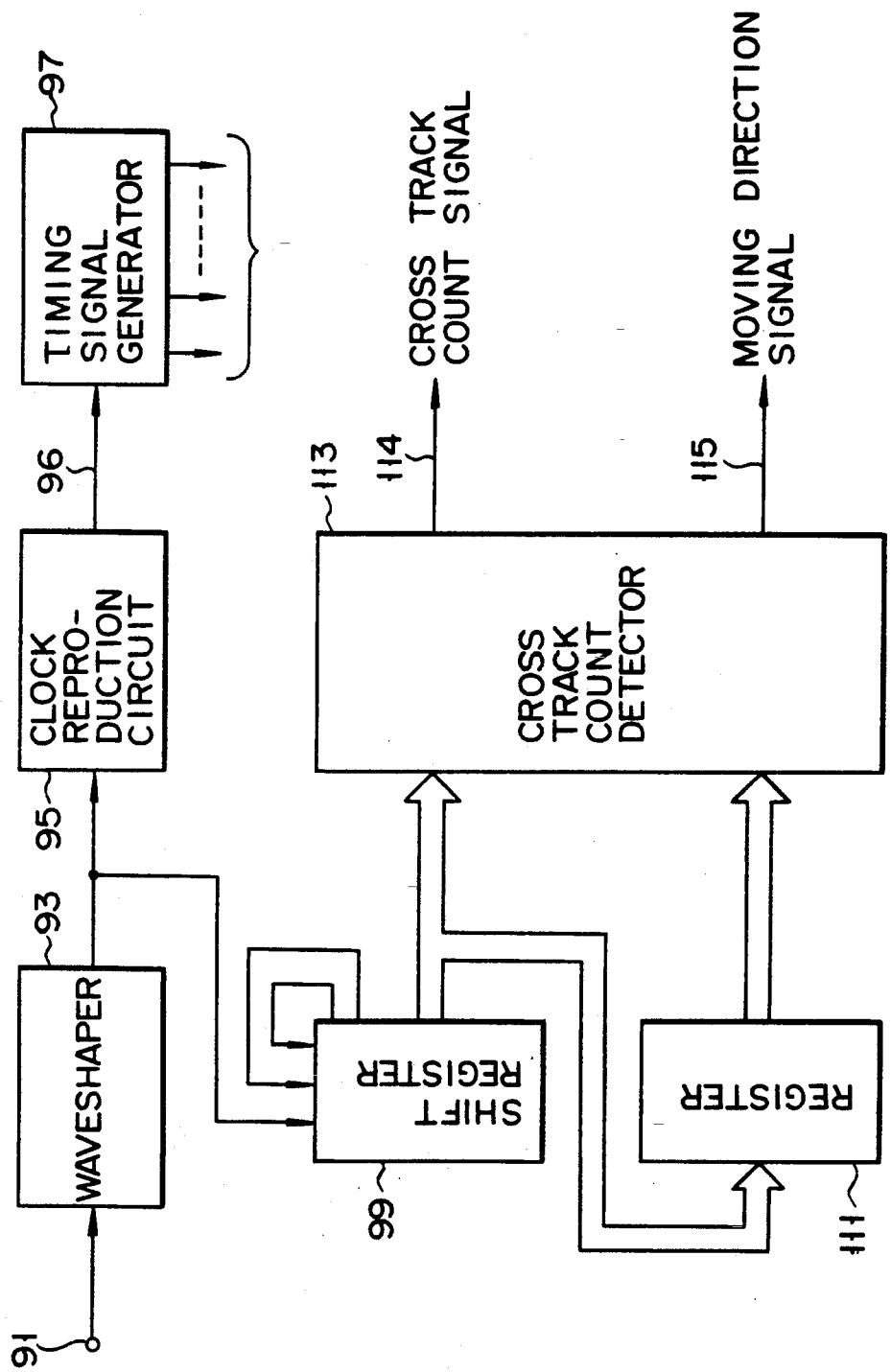
FIG. 15 is a block diagram of an optical disk apparatus according to still another embodiment of the present invention.

According to the embodiments shown in FIGS. 13 to 15, a track count during access is detected based on a cross set count indicating the number of sets of access marks crossed by a light spot on an optical disk and a residual track count which is not greater than a track count on which the access marks form one set and is determined upon comparison between a pit pattern at the beginning of access and a pit pattern at the present timing. Even when a read error of the access mark occurs at a certain sample timing, since a correct track count can be obtained as long as the access mark is correctly read at the next sample timing, accumulation of cross track count errors can be avoided unlike in the prior art. In addition, since a set count need only be roughly counted, a count error can hardly occur. Therefore, a track count between tracks at the initial position and the present position during access can be obtained without causing a large error, and a highly reliable access operation is allowed.

Still another embodiment of the present invention will be described below with reference to FIG. 15.

According to this embodiment, a reflected light detection signal obtained by detecting light reflected by a sample servo type optical disk by an optical head is input to an input terminal 91. The detection signal from the optical disk is converted to binary data by a waveshaper 93. This binary data is input to a clock reproduction circuit 95. The clock reproduction circuit 95 generates a reproduced clock signal based on data of a portion of a clock pit 16 (FIG. 2) in the binary data. A timing signal generator 97 generates various timing signals required in an operation of a system based on the reproduced clock signal.

The binary data output from the waveshaper 93 is also input to a shift register 99 as a data fetching means. Access mark data as a partial output from the shift register 99 is input to a register 111, and is also input to a cross track count detector 113 together with the output data from the register 111. The register 111 stores the access mark data at a previous sample timing necessary for the cross track count detector 113.

The cross track count detector 113 compares the access mark data at the present sample timing as the output from the shift register 99 with the access mark data at the previous sample timing as the output from the register 111 to obtain a cross track count during one sample period and a moving direction of a light spot relative to the optical disk. The detector 113 then outputs a cross track count signal and a moving direction signal representing them.

Figure 17:
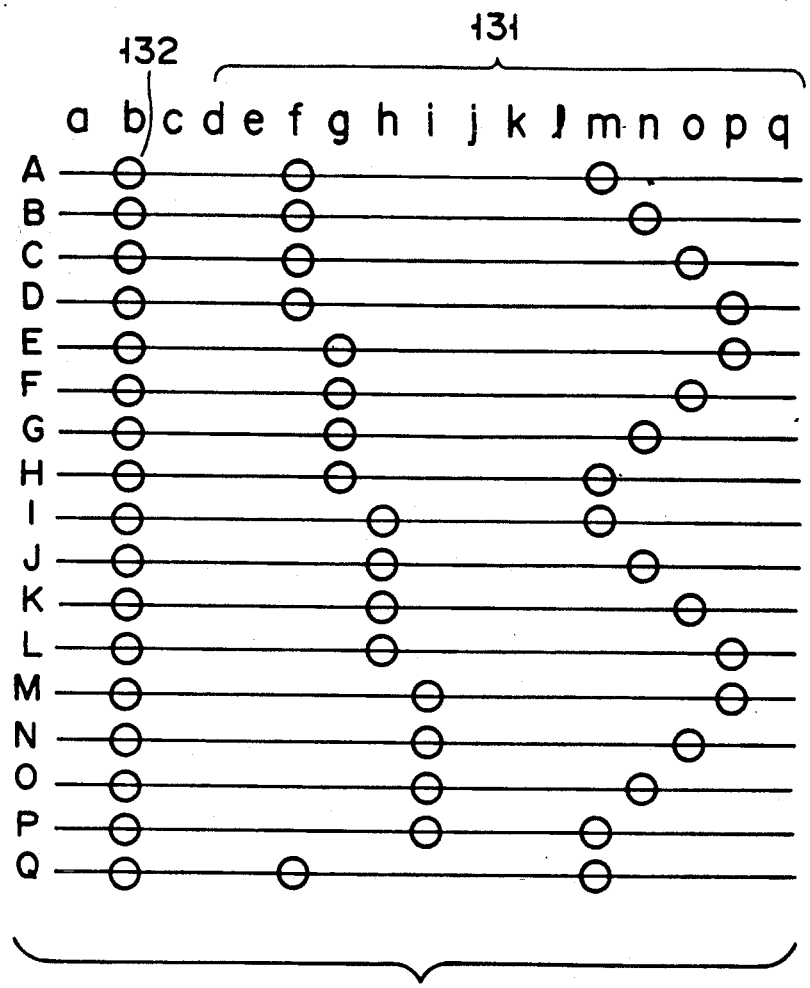
FIG. 17 shows a servo pattern on an optical disk used in the embodiment shown in FIG. 15.

FIG. 16 shows a detailed circuit of the shift register 99, and FIG. 17 shows a servo pattern of the optical disk used in this embodiment. In this servo pattern, A to P indicate tracks, and a to g indicate channel bit positions. The channel bit positions d to g are assigned to an access mark 131 for a track access, and 16 types of patterns are set. A reference pit 132 is formed at the channel bit position b of each of all the tracks A to P. The reference pit 132 may also serve as a clock pit.

The shift register 99 shown in FIG. 16 is a bidirectional shift register which can switch a shift direction, and has a data input terminal D, a system clock input terminal CK, right and left shift designation terminals RS and LS, and 16 output terminals a to g. The data input terminal D receives the binary data from the waveshaper 93, and the system clock input terminal CK receives an access mark sample signal as one of timing signals generated by the timing generator 97.

Of output data 122 from the output terminals a to g of the shift register 99, output data 122d to 122q from the output terminals d to g are input to the cross track count detector 113 as access mark data. Output data 122a and 122c from the output terminals a and c of the shift register 99 are input to the right and left shift designation terminals RS and LS. When data "1" is supplied to the terminal RS, the shift register 99 is shifted to the right (direction of an arrow R), and when data "1" is supplied to the terminal LS, it is shifted to the left (direction of an arrow L). Note that the output terminal b of the shift register 99 is not assigned.

When data of the access mark 131 and data of the reference pit 132 shown in FIG. 17 are correctly fetched by the shift register 99, data of the channel bit position b as the reference pit 132 is output from the output terminal b of the shift register 99, and data at the channel bit positions d to g as the access mark pattern 131 are output from the output terminals d to g of the shift register 99.

The operation of the embodiment shown in FIG. 16 will be described below.

Figure 18:
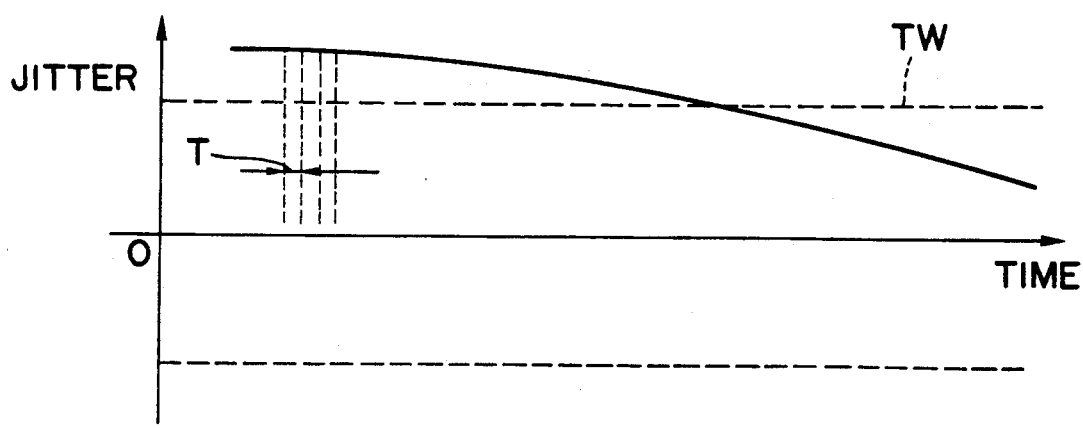
FIG. 18 is a graph showing a change in jitter of a reproduced clock signal in a high-speed seek mode as a function of time so as to explain the operation of the optical disk apparatus shown in FIG. 15.

FIG. 18 shows a change in jitter as a function of time in a reproduced clock signal in a high-speed seek mode. In general, a jitter generated during track access is mainly caused by wow and flutter of an optical disk or a mechanical vibration of an optical head moving mechanism. Therefore, a frequency component of the jitter is at most several kHz, and the jitter changes very slowly as compared to a time T required for a light beam to pass through a region of the access marks 131. For this reason, when the jitter of the reproduced clock signal exceeds a detection window TW and the position of appearance of data corresponding to the reference pit 132 at the fixed channel bit position b is changed in the output data 122 of the shift register 99, the direction and amount of a change in position of appearance can be detected.

Figure 19:
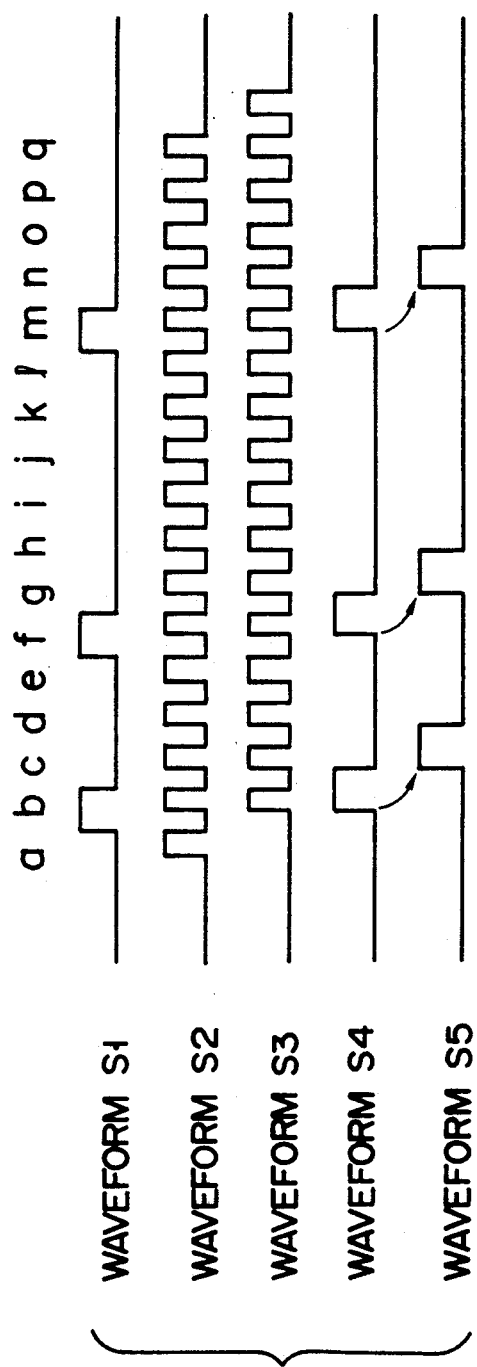
FIG. 19 shows timing charts for explaining the operation of FIG. 15.

FIG. 19 shows the relationship between binary data and the access mark sample signal when a light beam passes across the track A shown in FIG. 17. Waveforms Wa and Wb represent the normal relationship. Assuming that the phase of the access mark sample signal is changed as shown in a waveform Wc of FIG. 19 since a jitter exceeds the detection window TW the binary data is fetched as if it were shifted to the left by one channel bit, as indicated by a waveform Wd in FIG. 19. More specifically, data at the channel bit positions a to g should originally appear at the corresponding output terminals a to g of the shift register 99. However, binary data at the channel bit positions are shifted to the left by one channel bit such that data at the channel bit position b appears at the output terminal a, data at the channel bit position c appears at the output terminal b, and so on.

At this time, it can be detected based on the outputs 122a to 122c of the output data of the shift register 99 that data at the channel bit position b corresponding to the reference pit 132 is shifted and appears at the output terminal a corresponding to the pitless channel bit position a. In this case, although the output data 122a to 122c should be 122a="0", 122b="1", and 122c="0", they become 122a="1", 122b="0", and 122c="0". Since the output 122a goes to "1", the shift register 99 is shifted to the right by one bit after it fetches the 17-channel bit data. Therefore, data of an access mark at the channel bit positions d to g (access mark data) can be correctly obtained from the output terminals 122d to 122q, as indicated by a waveform e in FIG. 20.

In other words, in the phase relationship between the access mark sample signal and the access mark data, access mark data of the waveform Wd is correct for the waveform Wb of FIG. 19 as an access mark sample signal free from the influence of jitter of the reproduced clock signal. In this embodiment, an access mark data of the waveform We is obtained for the waveform Wc as an access mark sample signal whose phase is shifted due to the influence of jitter. The phase relationship between these waveforms Wc and We is the same as that of the waveforms Wb and Wd, and this means that access mark data is correctly read.

When the phase of an access mark sample signal is shifted to a direction opposite to the waveform Wc, the binary data is fetched by the shift register 99 while being shifted to the right by one channel bit. In this case, binary data from the corresponding channel bit positions appear while being shifted to the right by one channel bit, and it is detected based on the output data 122a to 122c of the shift register 99 that data from the channel bit position b corresponding to the reference pit 132 appears at the output terminal c corresponding to the pitless channel bit position c. In this case, 122a="0", 122b="0", and 122c="1". Since the output 122c goes to "1", the shift register 99 is shifted to the left by one bit after it fetches 17-channel bit data, thus correctly reading the access mark.

In this embodiment, since binary data at the channel bit positions a to c are obtained first, a direction to be shifted is detected based on the output data 122a to 122c of the output terminals a to c of the shift register 99 as soon as these binary data are fetched by the shift register 99. Based on the detected direction to be shifted, the fetching positions of data at the channel bit positions d to g as the access mark may be shifted, thus obtaining the same effect as in the above embodiment.

Figure 20:
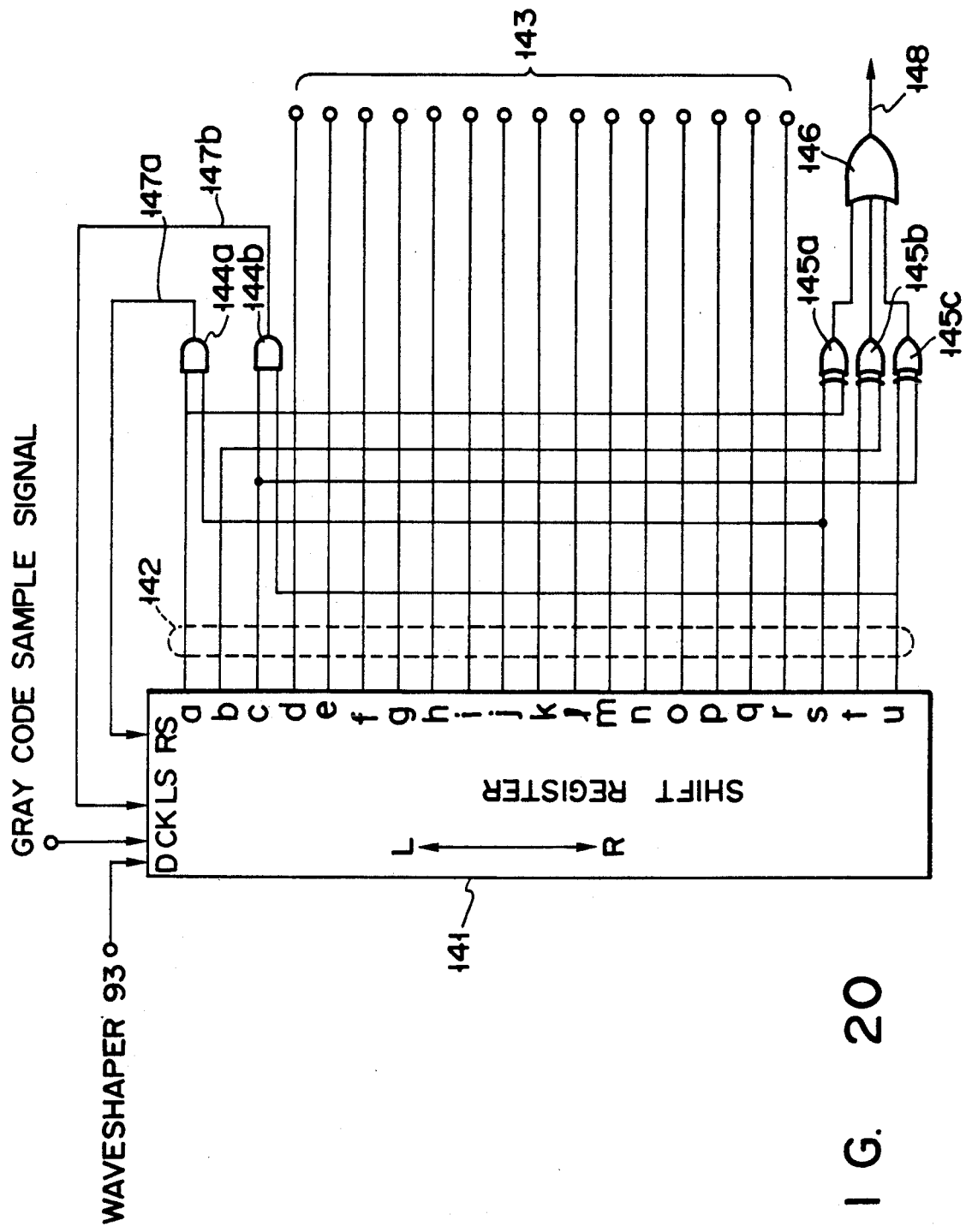
FIG. 20 is a circuit diagram of principal parts of an optical disk apparatus according to another embodiment associated with the embodiment shown in FIG. 15.
Figure 21:
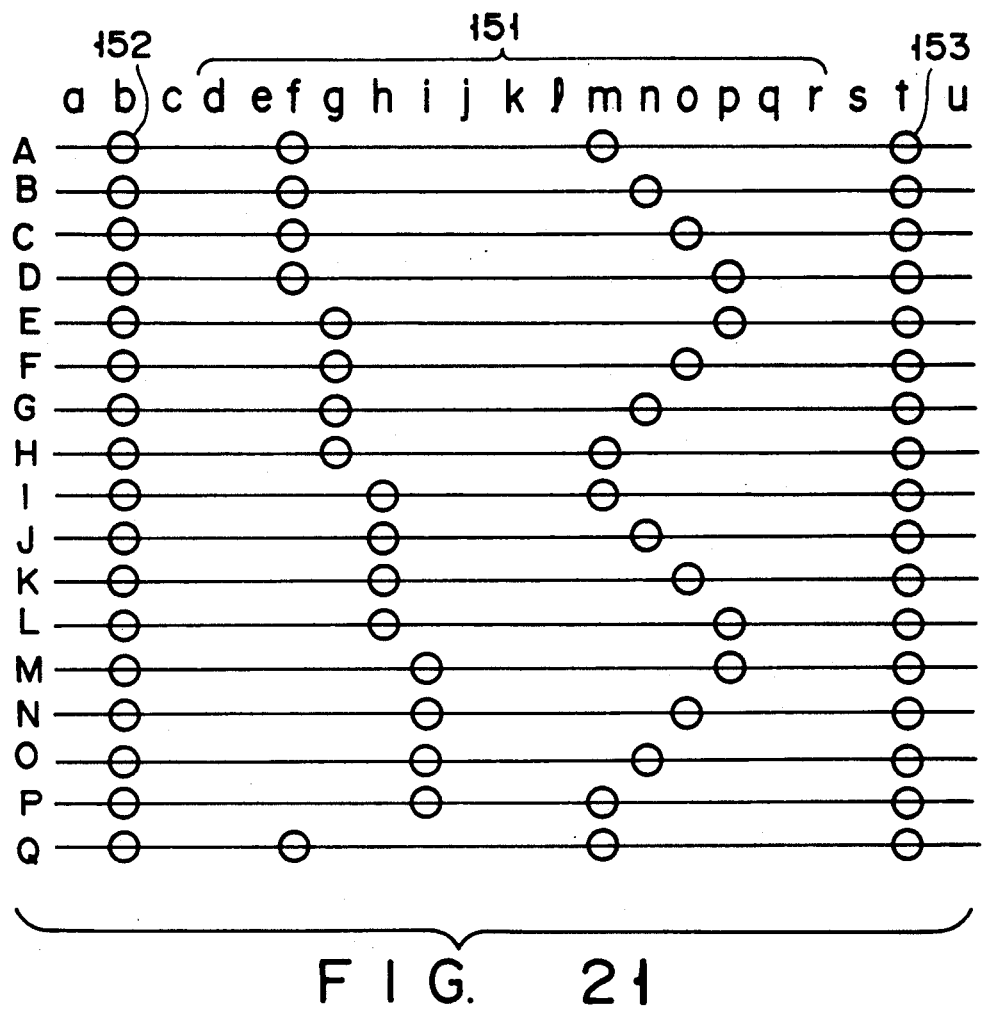
FIG. 21 shows a servo pattern on an optical disk used in the optical disk apparatus shown in FIG. 20.

According to another embodiment shown in FIG. 20, an optical disk having a servo pattern shown in FIG. 21 is used. In the servo pattern shown in FIG. 21, A to Q indicate tracks, and a to u indicate channel bit positions. The channel bit positions d to r are assigned to an access mark 151 as a track access pattern. Reference pits 152 and 153 are formed at the channel bit positions b and t of each of all the tracks A to Q. One of the reference pits 152 and 153 may also serve as a clock pit.

A shift register 141 shown in FIG. 20 is a bidirectional shift register which can change a shift direction, and has a data input terminal D, a clock input terminal CK, right and left shift designation terminals RS and LS, and 21 output terminals a to u. The data input terminal D receives the binary data from the waveshaper 93 shown in FIG. 15, and the clock input terminal CK receives an access mark sample signal as a portion of a timing signal generated by the timing generator 97.

Of output data 142 from the output terminals a to u of the shift register 141, data from the output terminals d to r are input to the cross track count detector 113 shown in FIG. 15 as access mark data 143. Output data from the output terminal a of the shift register 141 is supplied to one input terminal of an AND gate 144a, and one input terminal of an XOR (exclusive OR) gate 145a. Output data from the terminal b is supplied to one input terminal of an XOR gate 145b. Output data from the output terminal c is supplied to one input terminal of an AND gate 144b and one input terminal of a XOR gate 145c.

Furthermore, output data from the output terminal of the shift register 141 is supplied to the other input terminal of the AND gate 144a and the other input terminal of the XOR gate 145a. Output data from the output terminal t is supplied to the other input terminal of the XOR gate 145b. Output data from the output terminal u is supplied to the other input terminal of the AND gate 144b and the other input terminal of the XOR gate 145c.

Output data 147a and 147b of the AND gates 144a and 144b are respectively input to the right and left shift designation terminals RS and LS of the shift register 141. When data "1" is supplied to the terminal RS, the shift register 141 is shifted to the right (direction of an arrow R), and when data "1" is supplied to the terminal LS, it is shifted to the left (direction of an arrow L).

The output data from the XOR gates 145a, 145b, and 145c are input to an OR gate 146, and output data 148 of the OR gate 146 is supplied to the cross track count detector 113 shown in FIG. 15.

When the shift register 141 correctly fetches data of the access mark 151 and data of the reference pits 152 and 153 shown in FIG. 21, data at the channel bit positions d and r as the reference pits 152 and 153 are output from the output terminal b of the shift register 141, and data at the channel bit positions d to r as the access mark 151 are output from the output terminals d to r of the shift register 141.

In this embodiment, when the output data from the AND gate 144a goes to "1", i.e., when the data of both the two reference pits 152 and 153 are shifted to the left by one channel bit, the shift register 141 is shifted to the right by one bit after it fetches 21-bit data. When the output data from the AND gate 144b goes to "1", i.e., when the data of both the two reference pits 152 and 153 are shifted to the right by one channel bit, the shift register 141 is shifted to the left by one bit after it fetches 21-bit data. Thus, the access mark can be correctly fetched.

When data from the reference pits 152 and 153 are shifted, it is checked if they are changed in the same direction by the same amount. If not so, discrimination signal data 148 indicating that access mark data 143 output from the shift register 141 is not correct is supplied to the cross track count detector 113 shown in FIG. 15.

According to the embodiment shown in FIG. 20, the following effects can be provided.

Figure 22:
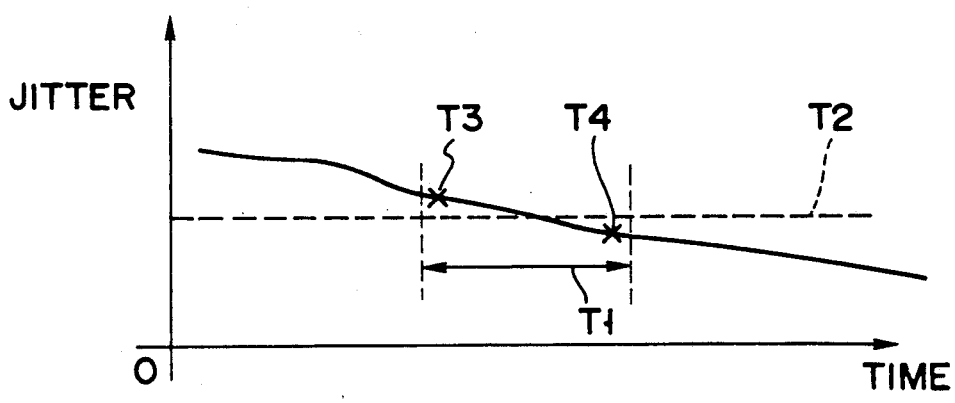
FIG. 22 is a graph showing a change in jitter of a reproduced clock signal in a high-speed seek mode as a function of time so as to explain the operation of the optical disk apparatus shown in FIG. 20.

As shown in FIG. 22, when a jitter of the reproduced clock signal crosses a detection window T2 during a period T1 in which a light beam passes across a region of the access mark 151 as the track access pattern, it is detected at a front jitter detection position T3 during the period T1 that the jitter exceeds the detection window T2. However, it is determined at a rear jitter detection position T4 during the period T1 that the jitter does not satisfy the detection window T2. Therefore, when a change in fetching position of access mark data due to jitter is detected at only a front or rear side of the access mark 151 in the track direction, the access mark may be erroneously read.

Contrary to this, according to this embodiment, when the positions of appearance of data from the two reference pits 152 and 153 at the front and rear sides of the access mark 151 are changed in the same direction by the same amount, the fetching positions of the access mark data in the shift register 141 are changed. Therefore, as shown in FIG. 22, when the jitter of the reproduced clock signal crosses the detection window T2 during the period T1 in which a light beam passes across the access mark 151, the shift register 141 does not perform a shift operation after it fetches data, thus always correctly reading access mark.

According to the embodiment shown in FIGS. 15 to 23, even when a reproduced clock signal includes a jitter for a ½ period or more, the data fetching positions of a track access pattern are corrected, so that the track access pattern can be correctly read.

Therefore, even in the high-speed seek mode, movement of a light beam relative to the optical disk can be precisely detected, and reliable track crossing can be performed.

Figure 25:
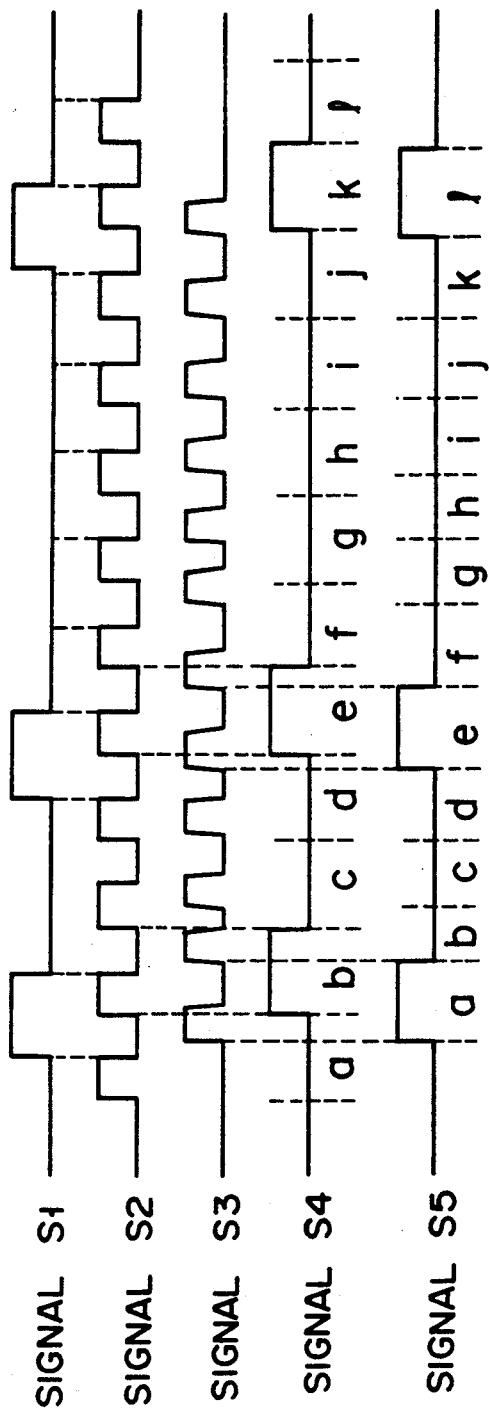
FIG. 25 is a timing chart of signals obtained from the circuit shown in FIG. 24.

Still another embodiment of the present invention will be described below with reference to FIGS. 23 and 25.

Tracks A to P have 16 different patterns. 12 channel bits a to l are determined with reference to a clock pit 16. The 16 patterns are constituted by those in which the presence/absence of one pit is inverted in one of radially adjacent access marks on adjacent tracks.

On each track, adjacent pits are defined on pit lines b, e, h, and k separated from each other by at least three channel bits.

In other words, the access marks A to P are formed so that the presence/absence of one bit in adjacent patterns is inverted on the pit lines b, e, h, and k separated from each other by three channel bits, and repetitively appear in the radial direction of the track. More specifically, in the patterns B and C, the presence/absence of a pit is inverted on the pit line h. In the patterns I and J, the presence/absence of a pit is inverted on the pit line k. The following access marks are determined by these access marks.

| A... | 000 | 000 | 000 | 000 |
|---|---|---|---|---|
| B... | 000 | 000 | 000 | 010 |
| C... | 000 | 000 | 010 | 010 |
| . | . | . | . | . |
| I... | 010 | 010 | 000 | 000 |
| J... | 010 | 010 | 000 | 010 |
| . | . | . | . | . |
| O... | 010 | 000 | 000 | 010 |
| P... | 010 | 000 | 000 | 000 |

The access marks of this embodiment are defined so that the pits are formed on the pit lines b, e, h, and k. When pits are detected to be deviated from these pit lines, the access marks are corrected so that these pits are present on the above-mentioned pit lines. In this case, the access marks can be expressed by four digits as follows:

| A... | 0 | 0 | 0 | 0 |
|---|---|---|---|---|
| B... | 0 | 0 | 0 | 1 |
| C... | 0 | 0 | 1 | 1 |
| . | . | . | . | . |
| J... | 1 | 1 | 0 | 1 |
| . | . | . | . | . |
| P... | 1 | 0 | 0 | 0 |

Figure 23:
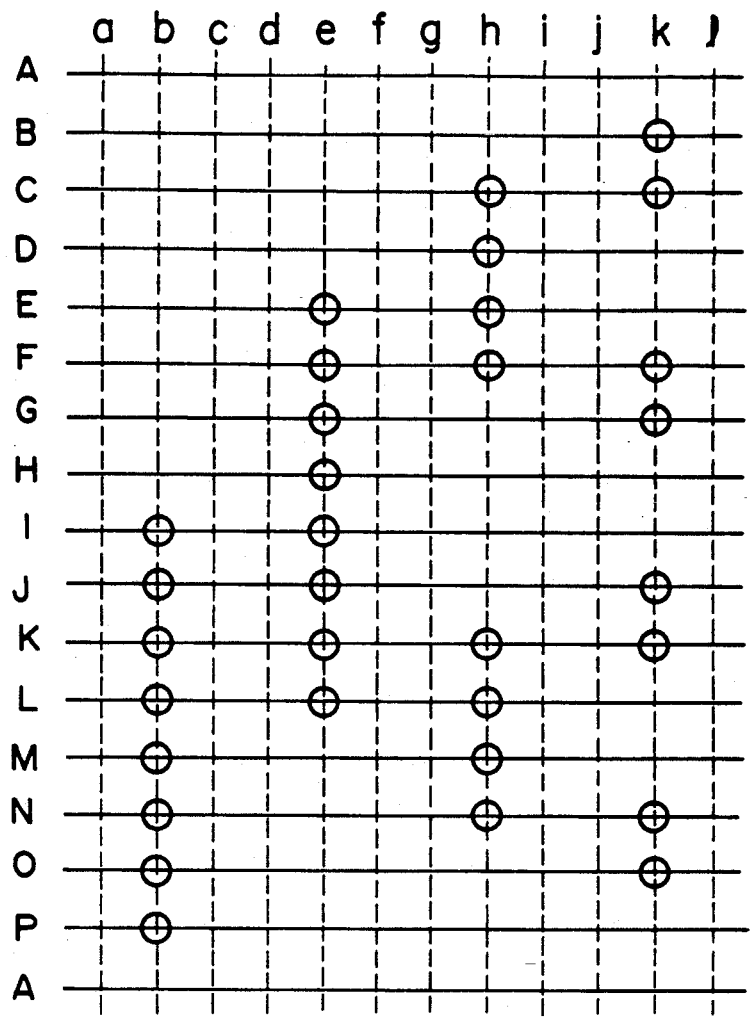
FIG. 23 shows an access mark set formed on an optical disk according to still another embodiment of the present invention.
Figure 24:
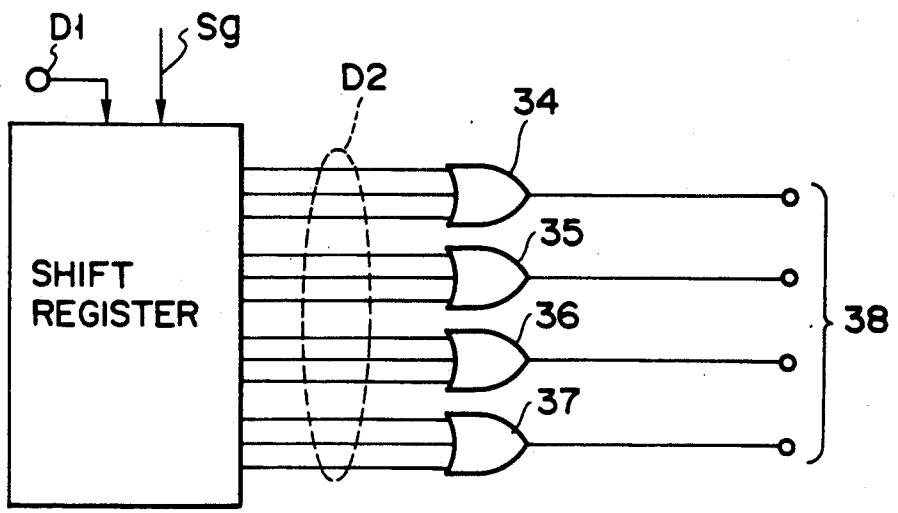
FIG. 24 is a circuit diagram of a circuit for outputting an access mark as an access mark signal.

The access marks shown in FIG. 23 are converted to access codes by a circuit shown in FIG. 24. According to this circuit, binary data D of an access mark read by an optical head is fetched by a shift register 162 in response to an access mark sample signal Sg. As a result, the shift register 162 outputs a 12-channel bit pattern signal D2. In this case, of 12 channel bits corresponding to the pit lines a to l, 3 bits corresponding to a total of three channel pits, i.e., each of channel pits on the data pit lines b, e, h, and k, and channel pits on two sides of each pit line are input to each of OR gates 164, 165, 166, and 167. More specifically, the data channel bit b and bits a and c on two sides of the bit b are logically ORed by the OR gate 164, and the data channel bit e and bits d and f on two sides of the bit e are logically ORed by the OR gate 165. Similarly, the data channel bit h and bits g and i on two sides of the bit h are logically ORed by the OR gate 166, and the data channel bit k and bits j and l on two sides of the bit k are logically ORed by the OR gate 167. As a result, 4-bit access mark can be obtained.

Figure 26:
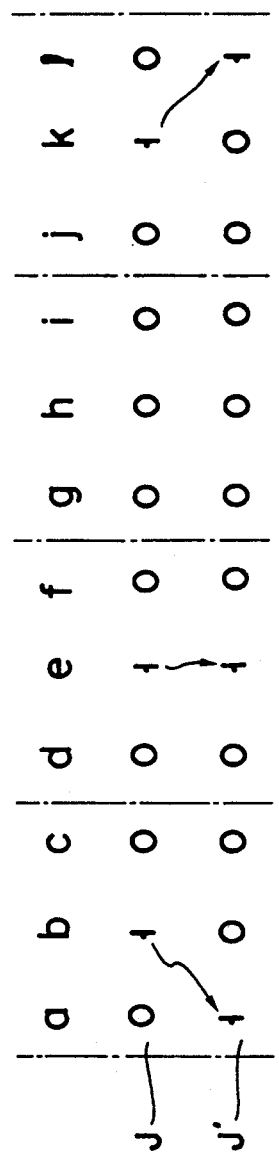
FIG. 26 is a view for explaining correction processing of the influence of jitter.

As shown in FIG. 26, when a pattern on the track J is to be sampled, for example, data S1 obtained by binarizing the pattern on this track J is fetched by the shift register 162 in response to an access mark sample signal S2. In this case, assume that a jitter exceeding ½ clock occurs, and the phase of the access mark sample signal S2 is shifted as a signal S3. Due to the phase shift, the output from the shift register 162 is changed from an original output S4 to S5. As a result, the channel bits b, e, h, and k of the 12-digit access mark are changed. More specifically, as shown in FIG. 26, the access mark J is changed to be J'. That is, the channel bits b, e, h, and k are changed to be a, e, h, and l. In this case, as shown in FIG. 23, in a track direction, since adjacent pits are separated by at least three channel bits, neighboring channel bits of the channel bits b, e, h, and k of the access mark do not include data patterns. Therefore, three channel bits, i.e., each of the channel bits b, e, h, and k as the central bit and two bits on two sides of the central bit are logically ORed. For this reason, even if the output from the shift register 162 is changed due to a jitter, a 4-bit access mark consisting of original channel bits b, e, h, and k can be easily restored.

In the high-speed seek operation, when a light spot passes across a region between tracks, since the presence/absence of only one channel bit of one of radially adjacent tracks is inverted on the adjacent tracks, an access mark detected at that time can coincide with one of the adjacent patterns every time the light spot passes across any track. For example, assuming that a light spot passes across a region between the tracks A and B, even if the patterns on both the tracks A and B are read, it is determined that the read track is the track B. Therefore, at an intermediate position, a shift of ½ track merely occurs, and an error of a cross track count detected at that time is a maximum of one track, thus minimizing an error.

Figure 27:
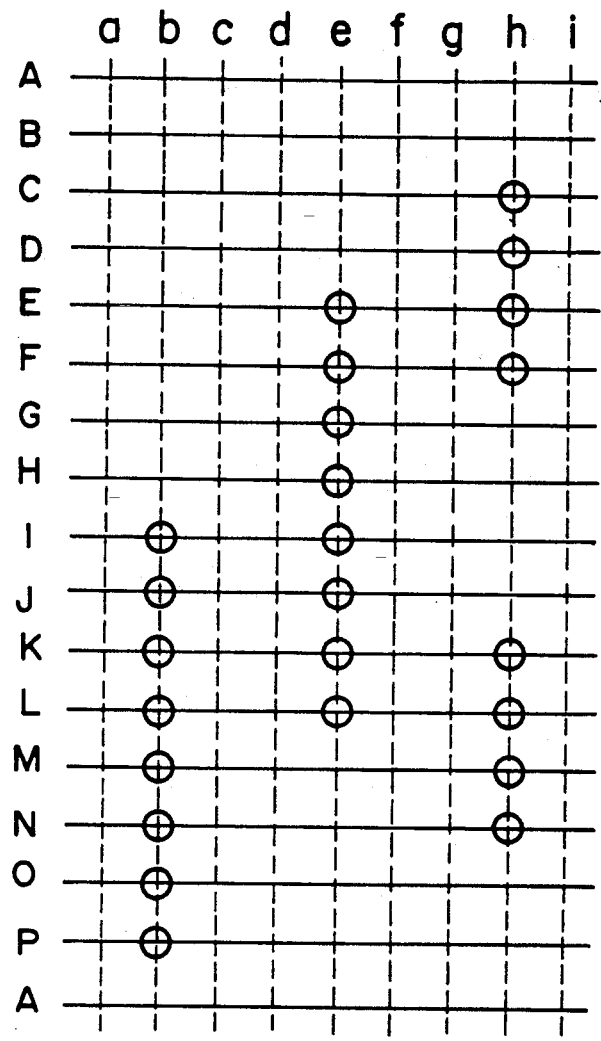
FIG. 27 shows another access mark set.

FIG. 27 shows other access marks. According to FIG. 27, the same marks are repetitively formed in the radial direction in units of two marks. According to the access marks, an error of a maximum of two tracks occurs. However, the access marks do not cause an error of, e.g., four tracks unlike in the prior art, and an access mark can be reproduced with a relatively small error.

As described above, according to the embodiment shown in FIGS. 23 to 27, even if a reproduced clock signal includes a jitter of a ½ clock period or more, an access mark can be accurately read. When a light spot passes across a region between tracks, an error of a cross track count can be minimized without causing a considerable read error of a pattern. As a result, relative movement between a light spot and access mark can be accurately detected during a high-speed seek operation.

In this embodiment, data bit lines are separated by three channel bits, but may be separated by four or more bits. A circuit for detecting the access mark is not limited to that shown in FIG. 24 but may be a circuit which can detect and logically OR the above-mentioned three bits.

Access marks of an optical disk according to still another embodiment of the present invention will be described below.

Figure 28:
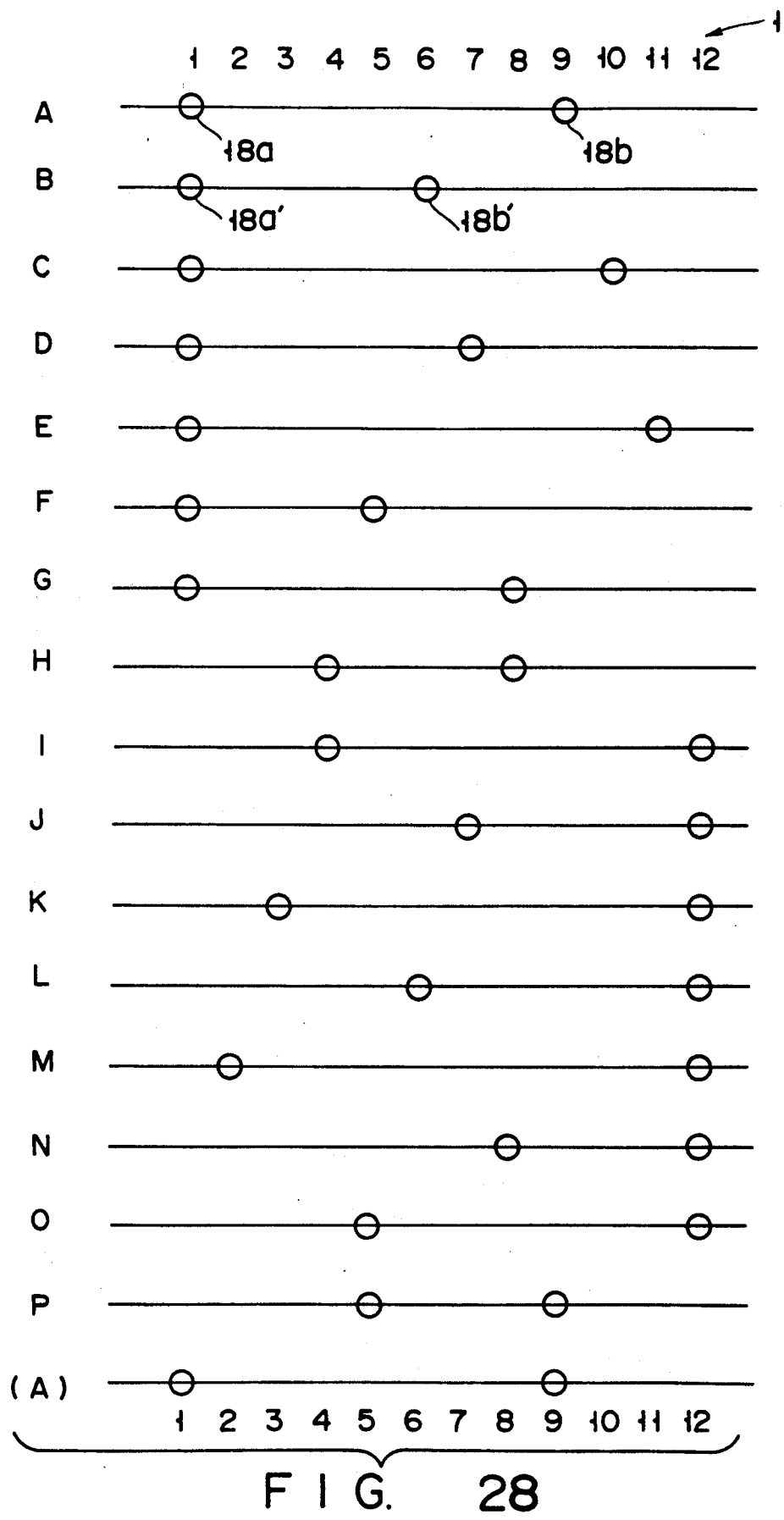
FIG. 28 shows still another access mark set.

A total of 16 different access marks are formed on tracks A to P shown in FIGS. 28. Each access mark is formed by two pits 18a and 18b which are separated from each other by two or more channel bits, and contains 12 channel bits.

Figure 29:
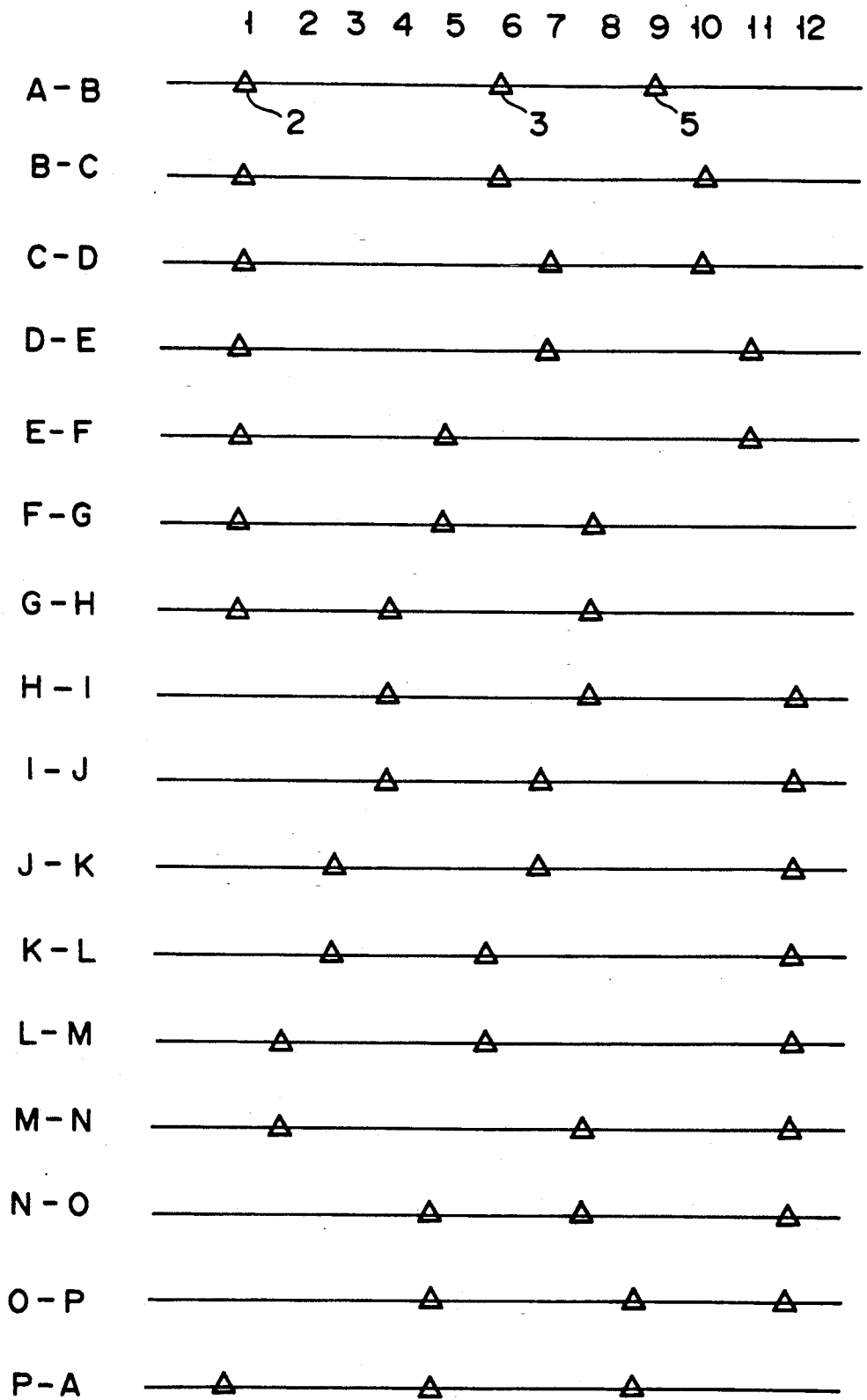
FIG. 29 shows a synthesized access mark set of two tracks.

FIG. 29 shows a synthesized pattern formed by synthesizing adjacent access marks shown in FIG. 28. For example, when a light beam spot passes across a region between the tracks A and B shown in FIG. 28, a pattern of a track A-B is read. On the tracks A and B, as shown in FIG. 28, of the two pits, pits 18a and 18a' of the first channel bits are formed at the same bit position "1". However, a pit 18b of the second channel bit on the track A is formed at the bit position "9", and a pit 18b' of the second channel bit on the track B is formed at the bit position "6". Of these pits, since the pits 18a, 18b, and 18b' are separated from each other by two or more channel bits, pulses corresponding to the access mark obtained from the track A-B are separated at an interval of two or more bits.

Figure 30:
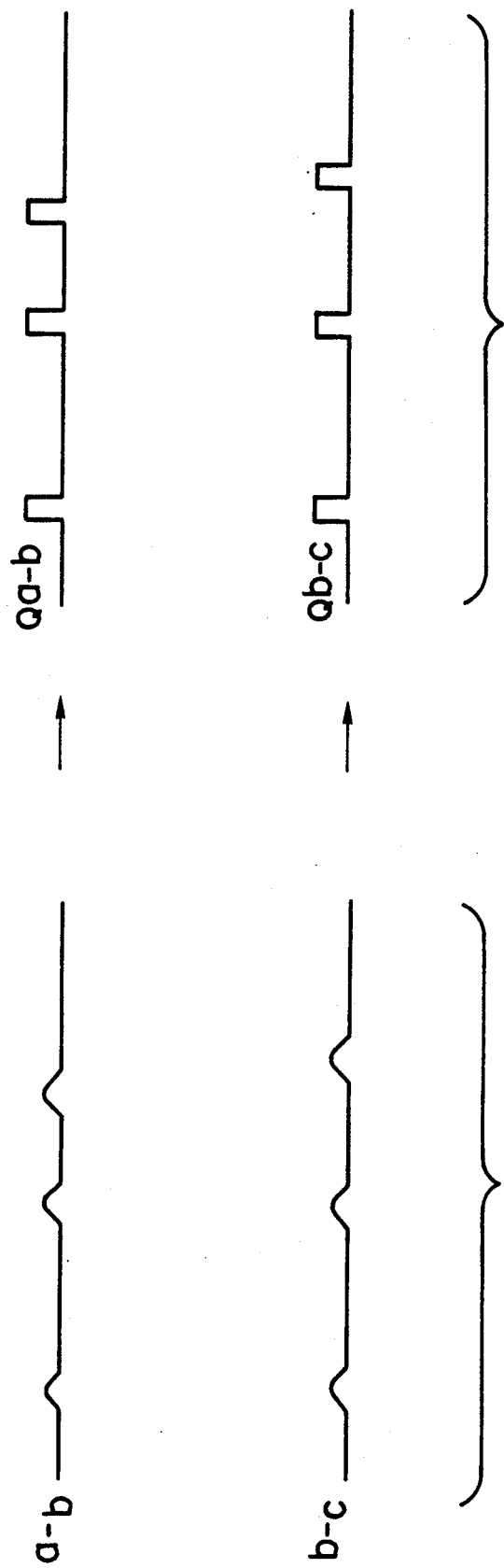
FIGS. 30A and 30B are waveform charts of an access mark signal.

FIG. 30A shows access mark signals corresponding to the track A-B and a track B-C. Although this access mark signal has a low level, since no pits are present at the adjacent channel bit positions, no interference occurs among pits. Therefore, even on a region between tracks, when the access mark signal is binarized and shaped, as shown in FIG. 30B, the pit positions can be prevented from being shifted or two pits can be prevented from being detected as one reproduced pit. In this embodiment, since all the 16 access marks formed on the 16 tracks are different from each other, a total of 32 combined patterns can be obtained, and the position of a pickup (optical head) can be more accurately detected.

When high-speed access is executed such that a light spot advances by several tracks during one sample period, a signal processing time for reading all the access marks shown in FIG. 28 to determine the access marks may pose a problem. However, in the patterns of this embodiment, since pits are formed at the first or 12th channel bit position of 14 tracks out of the 16 tracks, the cross track count in units of eight tracks can be quickly obtained by reading these pits.

Figure 32:
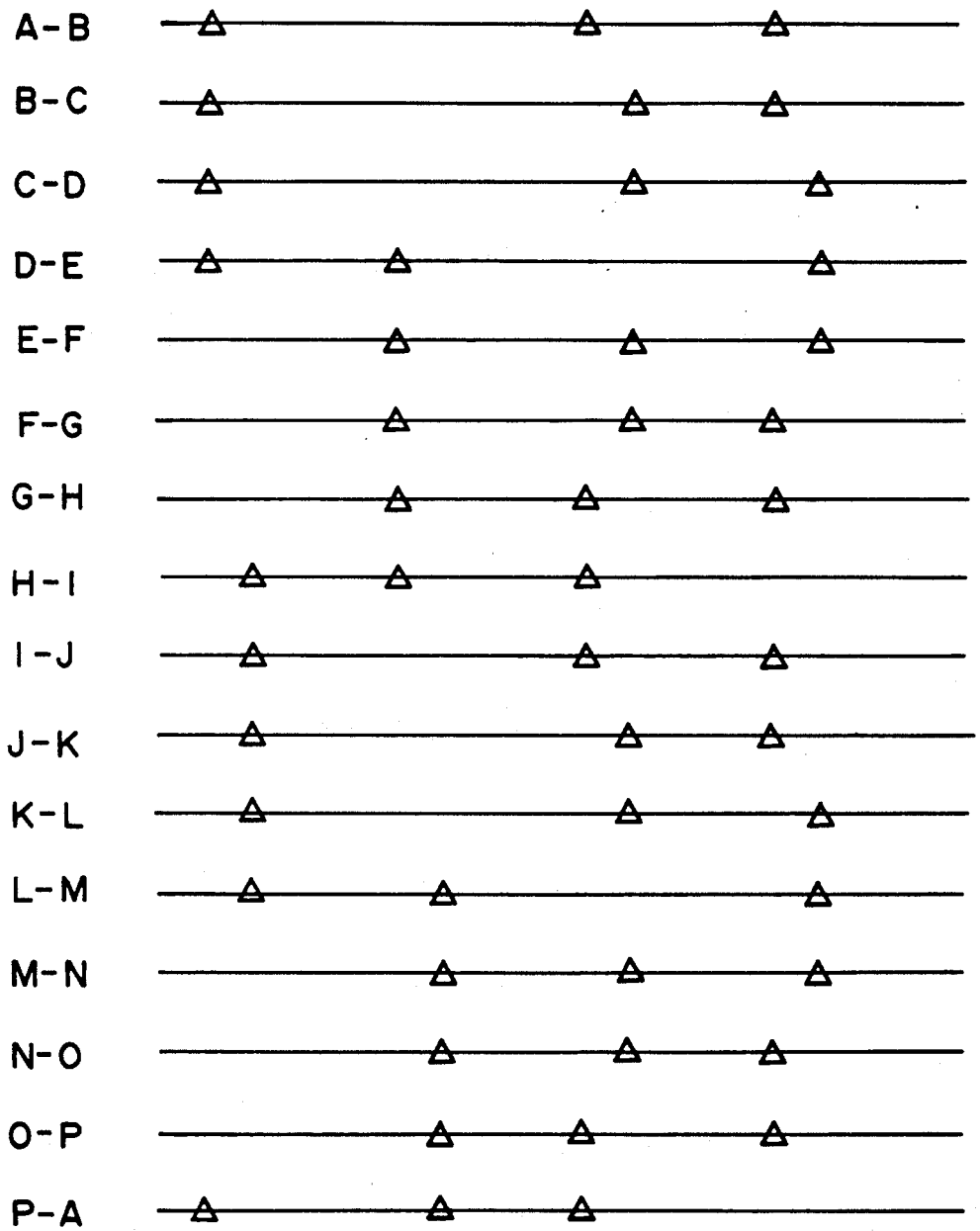
FIG. 32 shows a synthesized access mark set of two tracks.

According to access marks of still another embodiment of the present invention, an access mark defined by two pits is formed on each track, and a total of 16 different pit patterns are formed on the 16 tracks. Patterns read on regions between adjacent tracks are separated by two or more channel bits in terms of a pit interval, as shown in FIG. 32, and have different pattern forms. Therefore, the pit position can be prevented from being shifted or two pits can be prevented from being reproduced as one pit when an access mark is binarized and shaped on a region between adjacent tracks.

Figure 31:
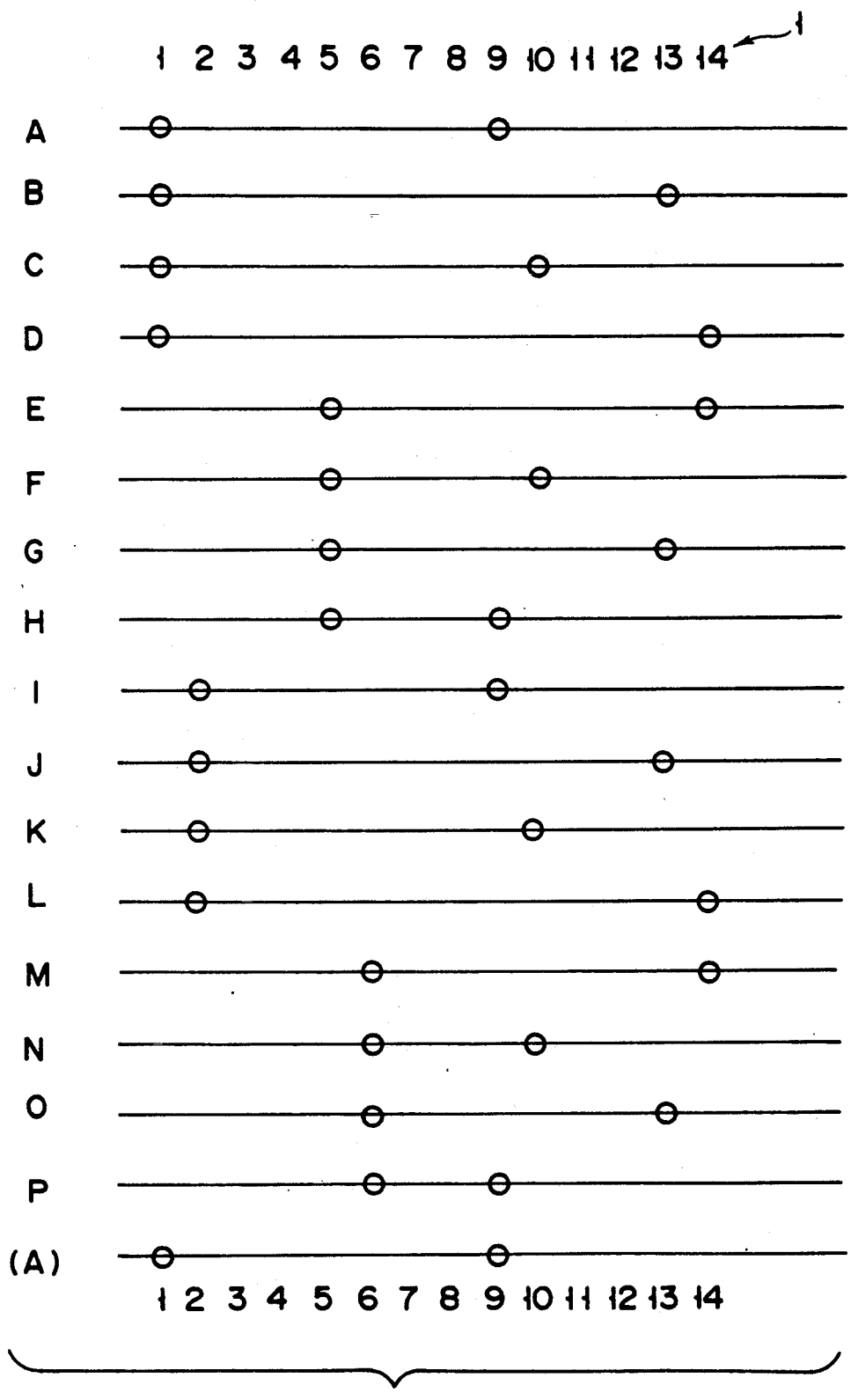
FIG. 31 shows still another access mark set.

In the patterns shown in FIG. 31 the pit patterns are regularly formed as compared to the patterns shown in FIG. 28, and the number of channel bits of the entire access mark is large. Therefore, when a pattern is printed on a sheet, it can be easily visually checked.

As described above, 16 pit patterns are formed on 16 tracks. However, any other cross track detection pit patters may be used. These pit patterns need not be changed for every track. For example, on 16 tracks, the two identical pit patterns may be arranged adjacent to each other, so that a total of 8 different pit patterns may be formed. Furthermore, three or more identical pit patterns may be formed adjacent to each other. When the identical patterns are formed on adjacent tracks, many types of pit patterns need not be used in an optical disk apparatus which performs high-speed access such that a light spot passes across several tracks during one sample period, resulting in easy access control.

Figure 33:
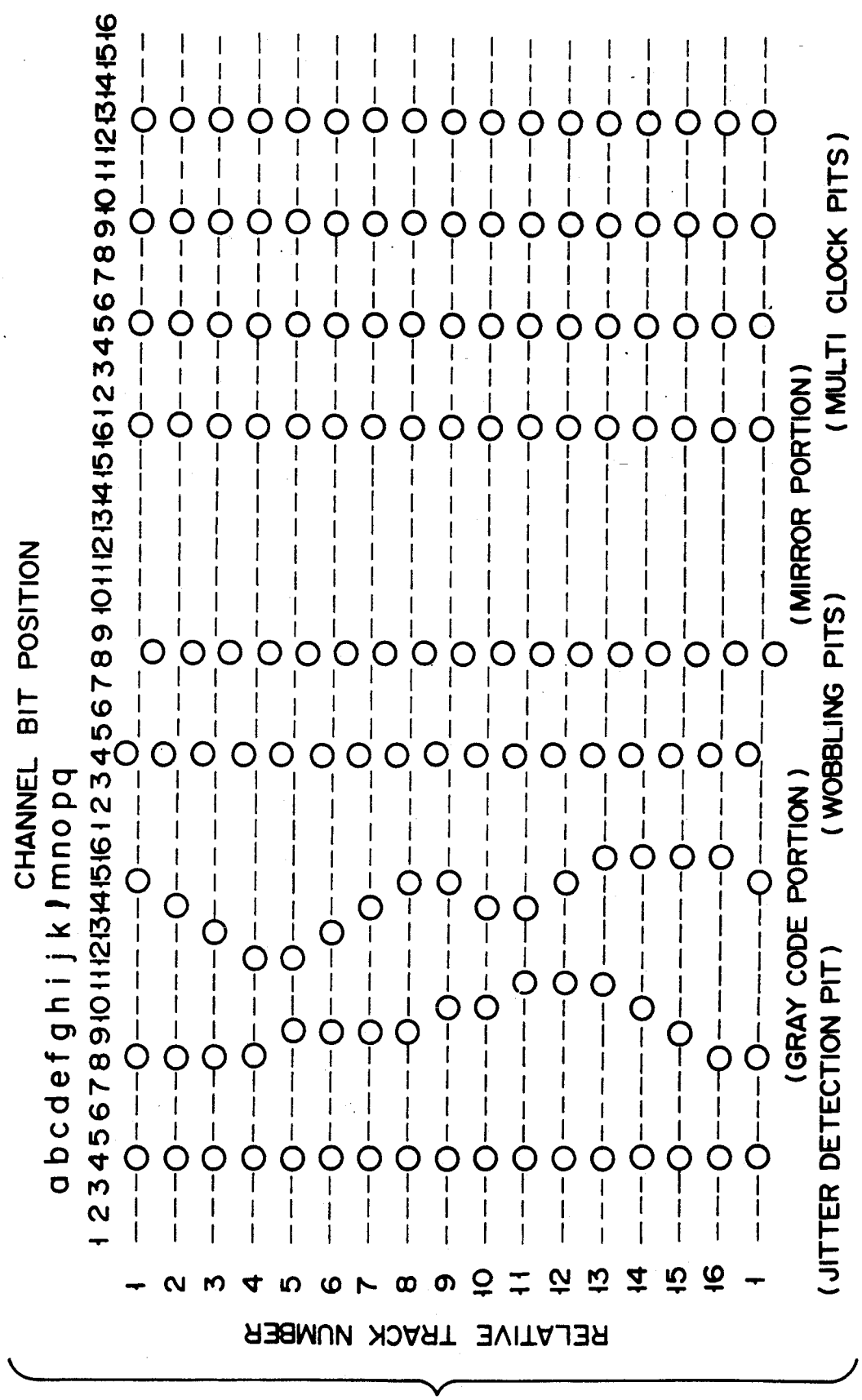
FIG. 33 is a view showing a pit pattern of an servo area formed on an optical disk according to still another embodiment of the present invention.

FIG. 33 shows the entire servo pattern. According to this servo pattern, a jitter detection pit, access mark pits, wobbling pits, a mirror portion, and multi clock pits are sequentially formed on the servo region along the track direction.

The servo region has a 3-byte configuration. In the first byte, the jitter detection pit is formed at the fourth channel bit position, and an access mark is formed at the eighth to 15th channel bit positions. In the second byte, the wobbling pits are formed at the fourth and eighth channel bit positions, and the 8-bit mirror portion which has a unique distance with respect to a 2/7 code is arranged at the ninth to 16th channel bit positions. In the third byte, the multi clock pit is formed. In this manner, pits using only position data are formed in the front portion of the servo region, and pits requiring amplitude data are formed in the rear portion, so that a servo control can be enhanced against a variation in light amount of a light beam in a data recording mode. In this configuration, since the clock pits are formed after the wobbling pits to sandwich the mirror portion therebetween, pattern matching for extracting a clock signal from the clock pits can be facilitated.

Each access code is defined by access marks as unit patterns each consisting of two pits. Sixteen different access marks are formed for a 16-track cycle. The shortest interpit space S between two pits constituting the unit pattern as the access mark is S=two channel bits, and a pattern length PL of the access mark is PL=9. The access marks are formed such that the position of one of the two pits of the unit pattern is changed by one bit on adjacent tracks.

Figure 34:
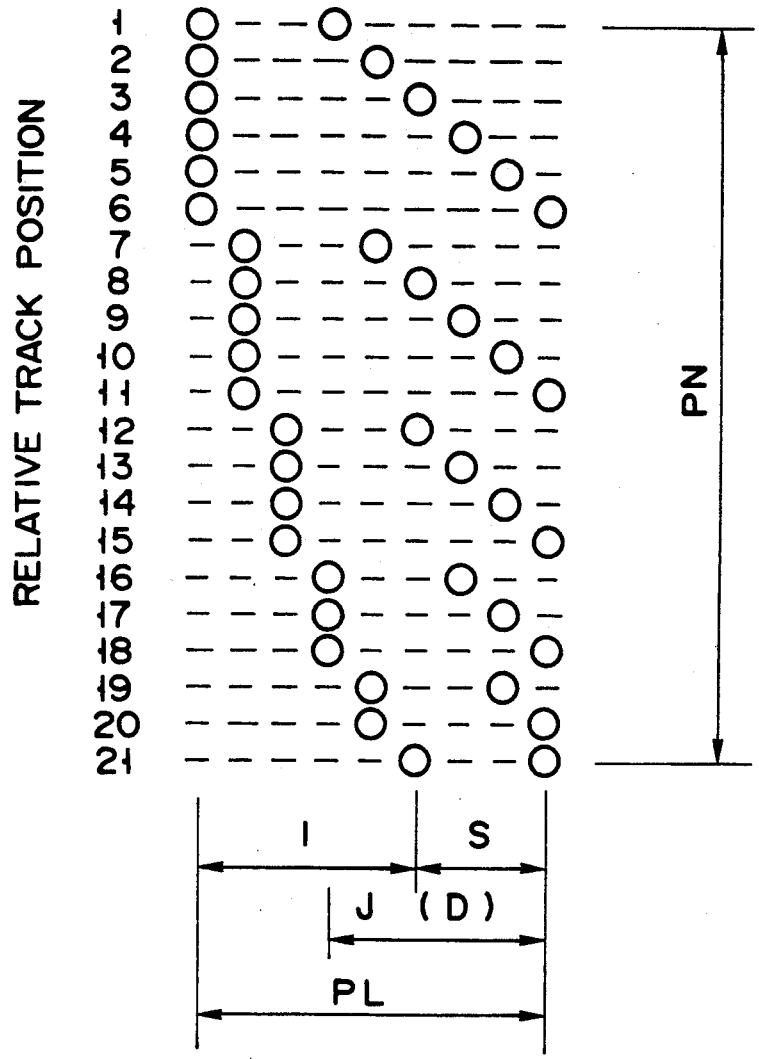
FIGS. 34 and 35 are views for explaining a configuration of an access marks.

The access marks are set as follows. As shown in FIG. 34, of two pits constituting the unit pattern of the access mark, the position of a leading pit with respect to the rotational direction of the optical disk is represented by I, the position of a trailing pit is represented by J, the shortest interpit space is represented by S, and the pattern length of the access mark is represented by PL. In this case, a maximum change width D of J is expressed by:

$$D = PL - (S+1) \quad (1)$$

A repetition cycle F (tracks) of the access marks satisfies:

$$F < \{(D+1)(D-1)+1\}/2 \quad (D: \text{even number})$$

or $$F < (D+1)(D-1)/2 \quad (D: \text{even number}) \quad (2)$$

Furthermore, from equation (1), a unit pattern count PN of access marks which can be used is given by:

$$PN = \frac{D(D+1)}{2} - 2 \quad (3)$$

In this case, S, F, D, PL, and PN are set as follows.

The access mark repetition cycle F is preferably a power of 2 since signal processing of an optical disk apparatus, especially, comparison/discrimination of access mark (to be described later) is realized by digital processing based on binary notation. When F is set to be a power of 2, the arrangement of a digital circuit can be simplified. F is selected to be a value with which a maximum direction discrimination speed upon discrimination of a relative moving speed of a light by reading an access mark has a sufficient margin with respect to an average seek time (16 msec). If F=, for example, 16 (=$2^4$), the maximum direction discrimination speed is 1.06 m/sec, and a margin for an average seek time can be sufficient. If F is set to be 8 (=$2^3$) as a power of 2 smaller than 16, the maximum direction discrimination speed becomes about 0.5 m/sec, and has no margin for the average seek time.

When F=16, Of two pits constituting the unit pattern of the access mark, the maximum change width D of the trailing pit with respect to the rotational direction of the optical disk is D=6 according to relation (2).

A peak shift amount obtained when an access mark is read with a light beam is increased as the shortest interpit space is decreased. When S=2 bits, the peak shift amount is at about 5%, and is allowable in a practical application. Thus, in this embodiment, S=2.

Since D=6 and S=2, the pattern length PL of the access mark is PL=9 from equation (1).

Since D=6, the pattern count PN of unit patterns which can be used as the access marks is PN=19 from equation (3).

According to 21 different unit patterns illustrated at relative track numbers 1 to 21 in FIG. 34, the leading pits of the patterns 1 to 6 are located at the channel bit position "1", and their trailing pits are located at the channel bit positions "4, 5, 6, 7, 8, and 9" while being sequentially shifted from each other. The leading pits of patterns 7 to 11 are located at the channel bit positions "2", and their trailing pits are located at the channel bit positions "5, 6, 7, 8, and 9" while being sequentially shifted from each other. The leading pits of the patterns 12 to 15 are located at the channel bit position "3", and their trailing pits are located at the channel bit positions "6, 7, 8, and 9" while being sequentially shifted from each other. The leading pits of the patterns 16 to 18 are located at the channel bit position "4", and their trailing pits are located at the channel bit positions "7, 8, and 9" while being sequentially shifted from each other. The leading pits of the patterns 19 and 20 are located at the channel bit position "5", and their trailing pits are located at the channel bit positions "8 and 9" while being sequentially shifted from each other. The leading pit of the pattern 21 is located at the channel bit position "6", and its trailing pit is located at the channel bit position "9".

Of 21 different unit patterns illustrated at relative track numbers 1 to 21 in FIG. 34, those at the numbers 2 to 20 excluding 1 and 21 are usable 19 different unit patterns. The access marks shown in FIG. 33 are 16 different unit patterns excluding those at the numbers 12, 19, and 20 from the usable 19 different unit patterns, and these patterns are arranged to obtain the access mark relationship on adjacent tracks.

Combinations of the unit patterns as the access mark can be obtained as follows.

Figure 35:
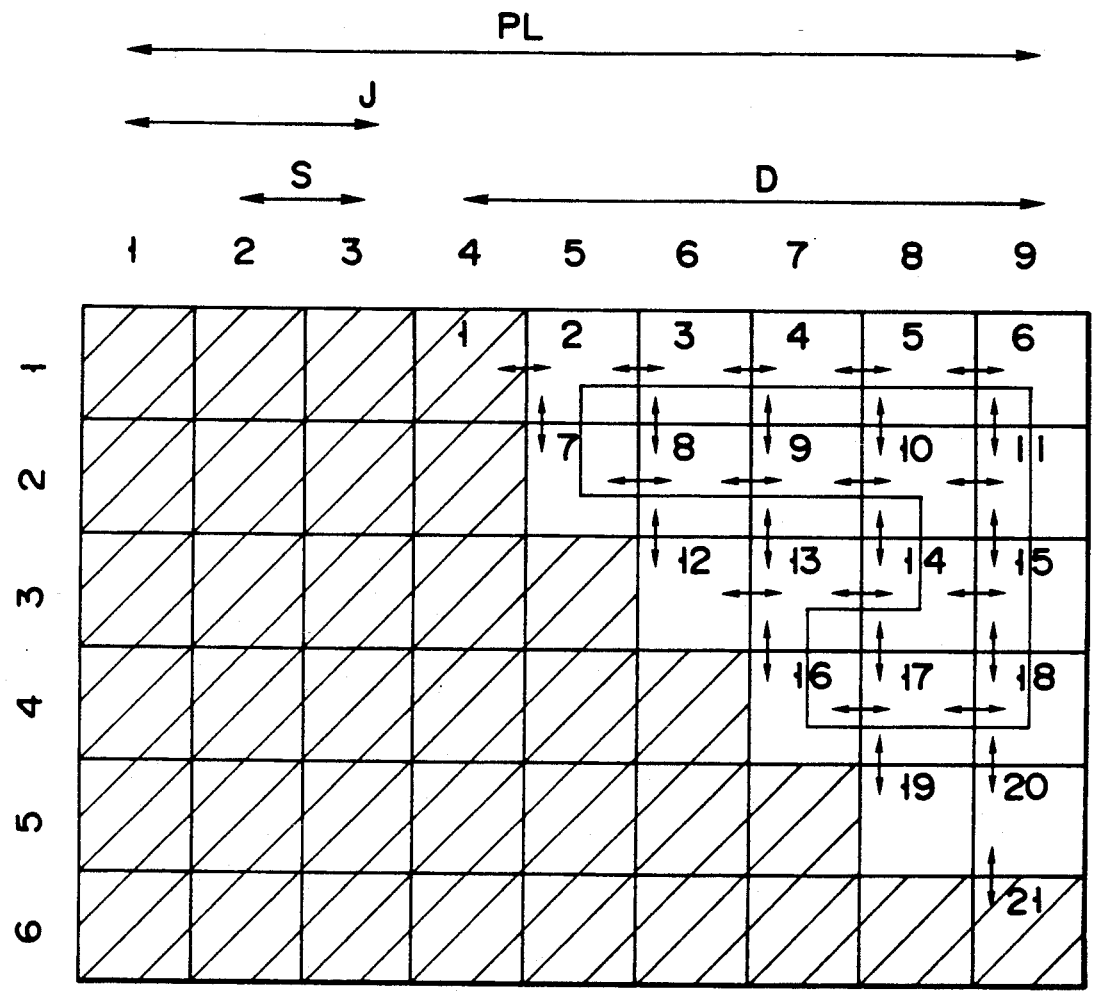
Figure 36A:
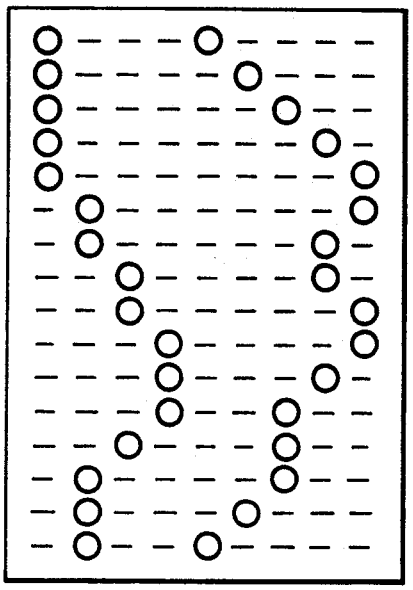
Figure 36B:
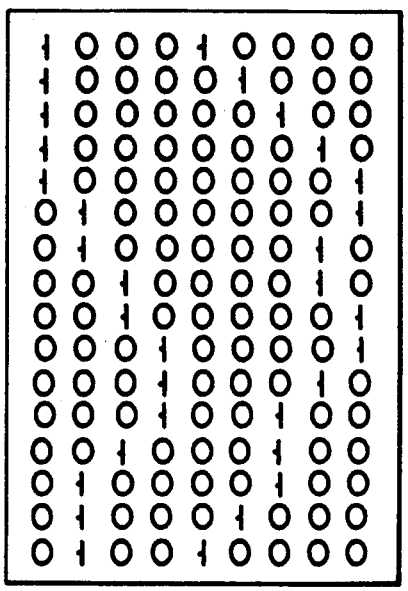
Figure 37A:
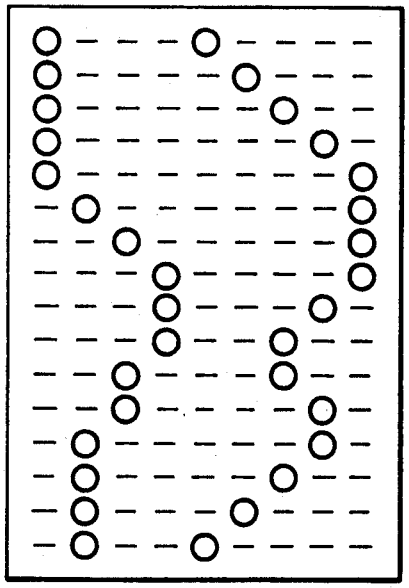
Figure 37B:
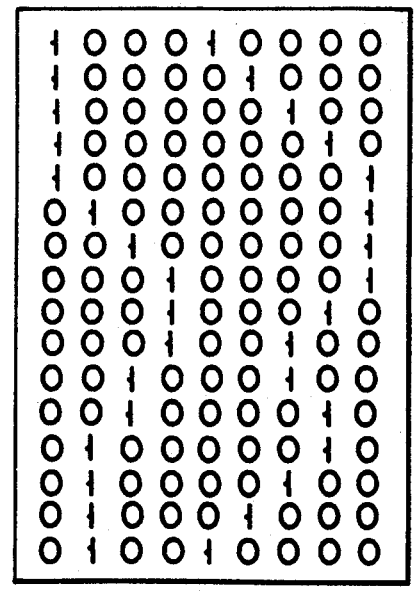
Figure 42A:
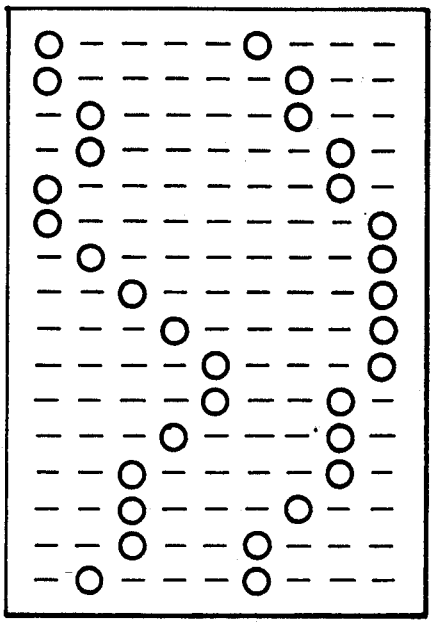
Figure 42B:
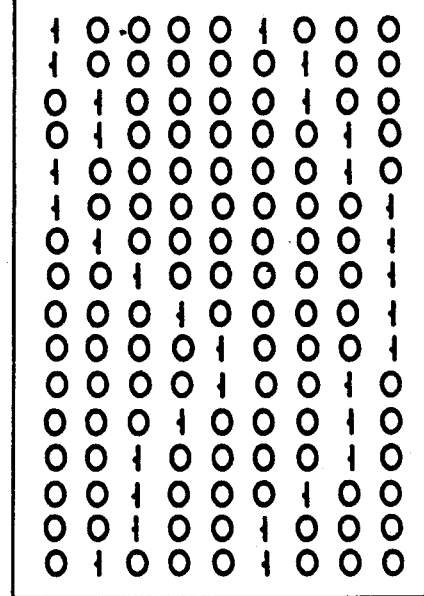
Figure 43A:
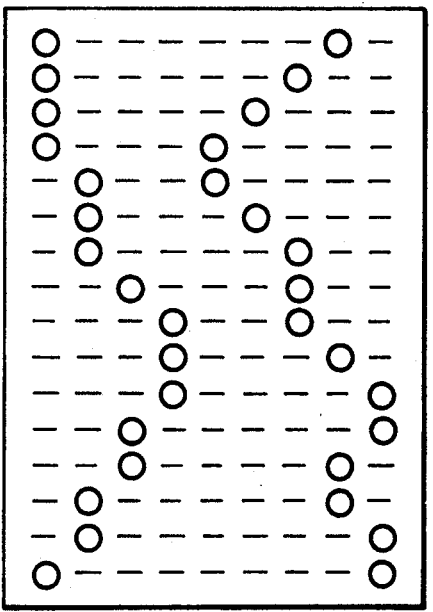
Figure 43B:
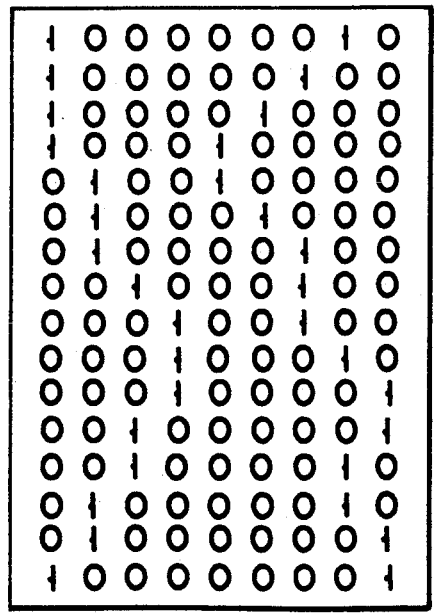
Figure 44A:
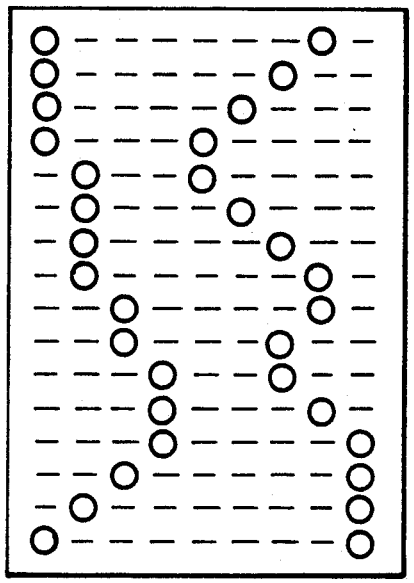
Figure 44B:
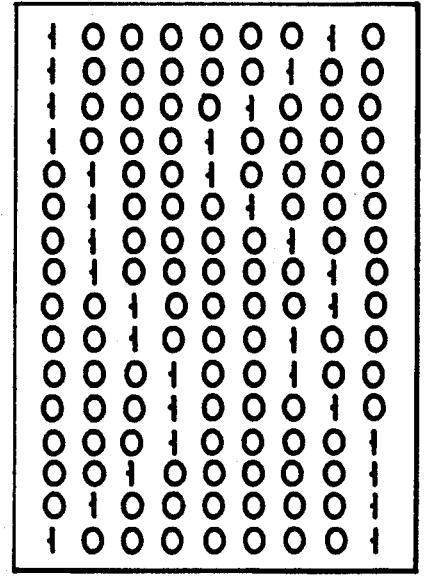
Figure 45A:
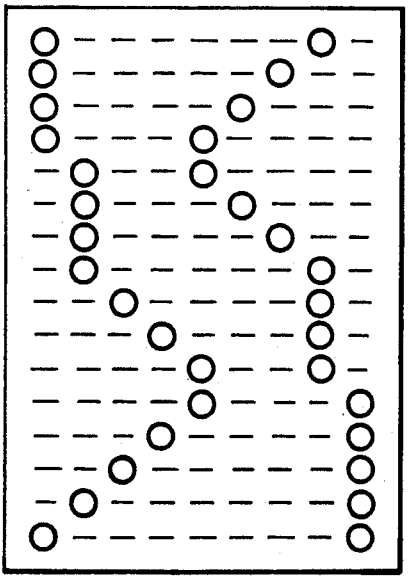
Figure 45B:
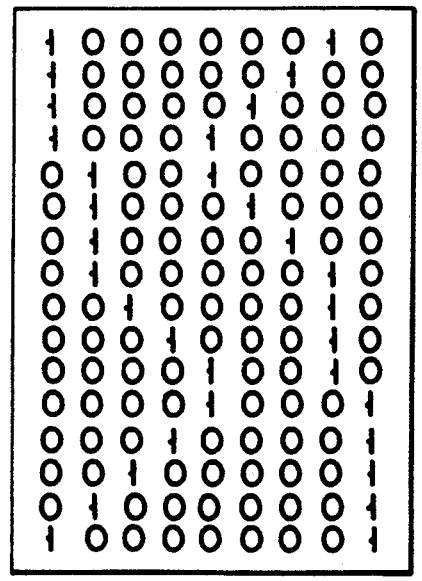
Figure 48A:
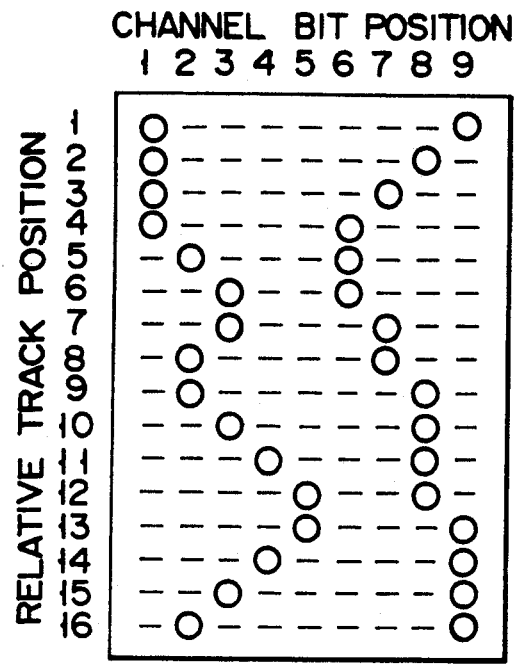
Figure 48B:
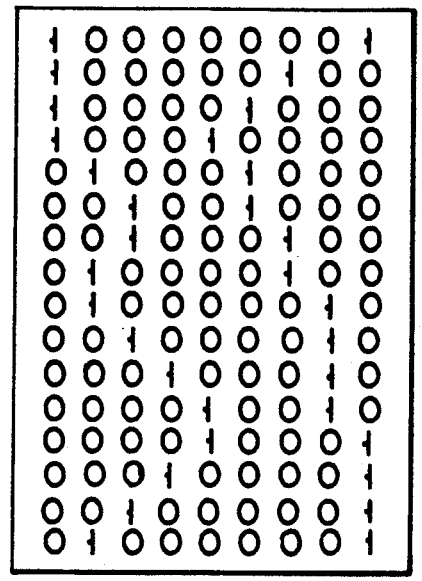
Figure 49A:
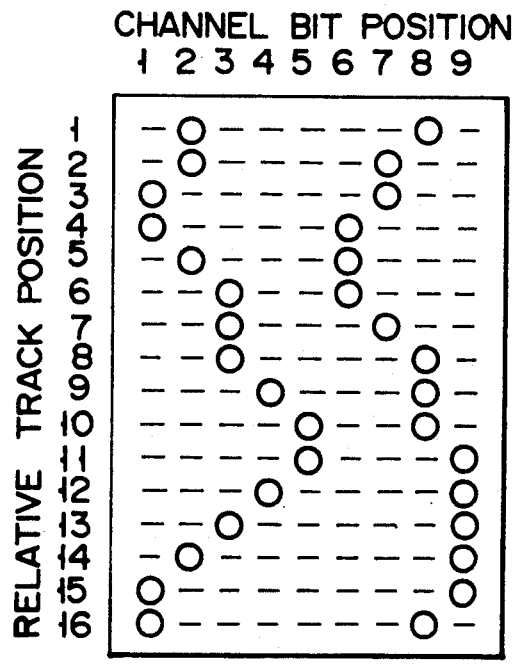
Figure 49B:
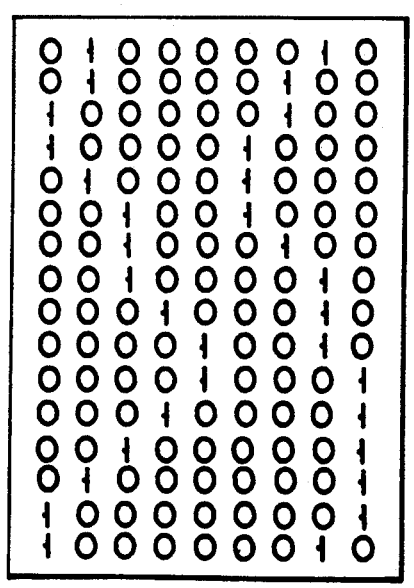

An examination will be made while the above-mentioned pit positions I and J are substituted by an array (I,J). As can be seen from FIG. 35, elements other than a hatched portion represent usable unit patterns, and of these elements, adjacent elements have the access mark relationship. More specifically, to form the access marks having the repetition cycle F=16 is to trace 16 elements with a single stroke from a certain element as a starting point in a region of the elements of these usable unit patterns to be returned to the starting element. The number of elements traced by the single stroke is obtained, and optimal patterns can be selected therefrom.

On the basis of this idea, the present inventors calculated all the possible cases using a computer, and obtained 58 access marks. Access marks which do not use three or more unit patterns having the shortest interpit space S are extracted from these 58 access marks in consideration of the influences of a peak shift and jitter in a seek operation, thus obtaining 14 codes shown in FIGS. 36A to 49A. FIGS. 36A to 49A show access marks on a disk, and a mark "o" represents a pit, and a mark "—" represents a non-pit region. FIGS. 36B to 49B show binary codes obtained by reading the corresponding access marks. The patterns shown in FIGS. 43A to 49A are symmetrical with the patterns shown in FIGS. 36A to 42A about a track axis, and are obtained by reordering the unit patterns at the relative track numbers 1 to 16 like 4, 3, 2, 1, 16, 15, . . . , 6, 5. Therefore, when the patterns having the symmetrical relationship about the track axis are considered as identical access marks, 7 optimal access marks are available. Note that the access mark shown in FIG. 33 is the same as that in FIG. 39A in practice, and has only different relative track numbers.

An optical disk of this embodiment has access mark in which the pattern length of the access mark is minimized, and the access mark relationship is assumed between adjacent tracks. Therefore, a capacity occupied by the servo byte including the access mark is decreased, and a storage capacity of data can be increased. In addition, detection errors of a cross track count and a relative moving direction and a relative moving speed of a light beam caused by the influences of a jitter or peak shift can be eliminated, thus assuring a highly reliable access operation.

There will now be described a reason that 16 types of unit patterns are most suitable to the optical disk of the present invention.

The specification of the optical disk used for recording and reproducing data is determined as follows:
Maximum velocity: Vmax(m/s)
Track pitch: Lp(m)
The number of rotations of disk: nd(1/s)
The number of segments: Ms
The number of unit patterns of access marks: Ng
The repetitive number of access marks: n $$V_{max} = \sqrt{\alpha \cdot \beta \cdot L_{max}}$$

$\alpha$: acceleration speed
Lmax: maximum seek distance
$\beta$: coefficient for determining reference speed
If the rotational speed is 3600 rpm, nd=60 (1/s)
Sampling frequency: Ms·nd The maximum value of the track count by which tracks are crossed during one sampling period, when the speed is detectable, is obtained by the following formula:

$$(\tfrac{1}{2})Ng \cdot n - 1$$

If the detected speed is larger than the maximum speed, the following formula can be established.
[Ng·n/2) − 1]Ms·nd·Lp > Vmax If, for example, the following conditions are given,
n = 1
Ms = 1680
nd = 60(1/s)
Vmax = 1(m/s)
Lp = 1.5 × 10⁻⁶(m),
the following formula is established
Ng > [(1/1680 × 60 × 1.5 × 10⁻⁶) + 1] × 2 = 15.2
That is, Ng ≧ 16

As understood from the above result, since the number (Ng) of unit patterns of access marks had better be smaller as possible as, to decrease the access marks area, Ng = 16 is most preferable.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A method of detecting a track count between a track at an initial position read at the beginning of access and a track at a current position read during access in an optical disk apparatus for recording/reproducing data on/from an optical disk, using a light beam, a plurality of track sets being formed in a radial direction on said optical disk, and each of said track sets having a predetermined number of tracks on which different access marks are formed every at least one track, said method comprising:

a step of counting the tracks to obtain the number of cross tracks while detecting simultaneously a first portion of the access mark which changes every track and a second portion of the access mark which changes every plurality of tracks;

a step of counting the track sets to obtain the number of track sets while detecting the second portion of the access mark which changes every plurality of tracks;

a step of obtaining from the number of cross tracks a remainder track count which does not reach a positive integer multiple of the predetermined number of tracks and a cross track set count representing the number of track sets crossed by the light beam during access; and a step of adding the remainder track count to a value obtained by multiplying the predetermined number of tracks with the cross track set count to obtain the track count.

2. The method according to claim 1, wherein said step of obtaining a remainder track count and a cross track set count includes a step of obtaining a difference between a first track number corresponding to the initial position and a second track number corresponding to the current position, a step of obtaining the remainder track count by dividing the difference by a result of the positive integer multiple, and a step of counting up the cross track set count in response to resetting of the remainder track count.

3. A method of detecting a track count between a track at an initial position read at the beginning of access and a track at a current position read during access in an optical disk apparatus for recording/reproducing data on/from an optical disk, using a liquid beam, a plurality of track sets being formed in a radial direction on the optical disk, each of said track sets having a predetermined number of tracks on which different specific pit patterns are formed every at least one track, comprising:

- a step of obtaining from the number of tracks a remainder track count which does not reach a positive integer multiple of the predetermined number of tracks and a cross track set count representing the number of tracks sets crossed by the light beam during access;
- a step of adding the remainder track count to a value obtained by multiplying the predetermined number of tracks with the cross track set count to obtain a candidate of the track count;
- a step of discriminating the presence/absence of a read error of the pit pattern at each simple timing;
- a step of comparing the pit pattern which is discriminated to be free from a read error and read at each sample timing with the edit pattern read at an immediately preceding sample timing to detect and store a cross track count representing the number of tracks crossed by the light beam between the two sample timings;
- a step of augmenting the stored cross track count by the number of successively occurring read errors; and
- a step of outputting the candidate of the track count as the cross track count when the absence of a read error is discriminated, and outputting a result of adding the cross track count augmented by the number of successively occurring errors to the candidate of the track count when the presence of the read error is discriminated.

4. The method according to claim 3, wherein said step of discriminating includes a step of comparing a current pit pattern with a reference pit pattern.

5. The method according to claim 4, wherein said step of discriminating includes a step of determining an error when the current pit pattern does not coincide with the reference pattern.

6. The method according to claim 3, wherein said step of discriminating includes a step of detecting a difference between the current cross track count and the previous track count which is discriminated to be free from a read error, and a step of determining an error on the basis of the difference.

7. The method according to claim 3, wherein said step of obtaining a remainder track count and a cross track set count includes a step of obtaining a difference between a first rack number corresponding to the initial position and a second track number corresponding to the current position, a step of obtaining the remainder track count by dividing the difference by a result of the positive integer multiple, and a step of counting up the cross track set count in response to resetting of the remainder track count.

8. The method according to claim 3, wherein said step of outputting the cross track count includes a step of outputting the candidate of the track count obtained in said step of adding as the cross track count when a speed of access is low.

9. The method according to claim 3, which further includes a step of resetting the cross track set count when one of a first state in which the remainder track count becomes zero, a second state in which the difference between the current cross track count and an immediately preceding cross track count is larger than a predetermined value, and a third state in which the current pit pattern does not coincide with a reference pit pattern is detected.

10. An apparatus for detecting a track count between a track at an initial position read at the beginning of access and a track at a current position read during access in an optical disk apparatus for recording/reproducing data on/from an optical disk, using a light beam, a plurality of track sets being formed in a radial direction on the optical disk, each of said track sets having a predetermined number of tracks on which different access marks are formed every at least one track, said apparatus comprising:

- means for counting the tracks to obtain the number of cross tracks while detecting simultaneously a first portion of the access mark which changes every track and a second portion of the access mark which changes every plurality of tracks;
- means for counting the track sets to obtain the number of track sets while detecting the second portion of the access mark which change every plurality of tracks;
- means for obtaining a remainder track count which does not reach a positive integer multiple of the predetermined number of tracks and a cross track set count representing the number of track sets crossed by the light beam during access;
- means for adding the remainder track count to a value obtained by multiplying the predetermined number of tracks with the cross track set count to obtain a candidate of the track count;
- means for discriminating the presence/absence of a pit pattern read error at each sample timing;
- means for comparing a pit pattern which is discriminated to be free from a read error and read at each sample timing with the pit pattern read at an immediately preceding sample timing to detect and store a cross track count representing the number of tracks crossed by the light beam between the two sample timings;
- means for augmenting the stored cross track count by the number of successively occurring read errors; and
- means for outputting the candidate of the track count is the cross track count when the absence of a read error is discriminated, and outputting a result of adding a cross track count augmented by the number of successively occurring errors to the candidate of the track count when the presence of a read error is discriminated.

11. The apparatus according to claim 10, wherein said means for discriminating includes means for comparing a current pit pattern with a reference pit pattern.

12. The apparatus according to claim 11, wherein said means for discriminating includes means for determining an error when the current pit pattern does not coincide with the reference pit pattern.

13. The apparatus according to claim 10, wherein said means for discriminating includes means for detecting a difference between the current cross track count and the previous track count which is discriminated to be free from the read error, and means for determining an error on the basis of the difference.

14. The apparatus according to claim 10, wherein said means for obtaining a remainder track count and a cross track set count includes means for obtaining a difference between a first track number corresponding to the initial position and a second track number corresponding to the current position, means for obtaining the remainder track count by dividing the difference by a result of the positive integer multiple, and means for counting up the cross track set count in response to resetting of the remainder track count.

15. The apparatus according to claim 10, wherein said means for outputting the cross track count includes means for outputting the candidate of the track count obtained by said means for adding as the cross track count when a speed of access is low.

16. The apparatus according to claim 10, which further includes means for resetting the cross track set count when one of a first state in which the remainder track count becomes zero, a second state in which the difference between the current cross track count and an immediately preceding cross track count is larger than a predetermined value, and a third state in which the current pit pattern does not coincide with a reference pit pattern is detected.

* * * * *

UNITED STATES PATENT AND TRADEMARK OFFICE
CERTIFICATE OF CORRECTION

PATENT NO. : 5,239,530
DATED : August 24, 1993
INVENTOR(S) : Naobumi Seo, et al

It is certified that error appears in the above-indentified patent and that said Letters Patent is hereby corrected as shown below:

On the Title Page, Item [73]:

"Canon Kabushiki Kaisha, Tokyo, Japan" should read --Kabushiki Kaisha Tashiba, Kawasaki, Japan--.

Attorney, Agent, or Firm information should be changed to read --OBLON, SPIVAK, McCLELLAND, MAIER & NEUSTADT--.

Signed and Sealed this

Nineteenth Day of April, 1994

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.   : 5,239,530
DATED        : August 24, 1993
INVENTOR(S)  : Naobumi Seo, et al It is certified that error appears in the above-identified patent and that said Letters Patent is hereby corrected as shown below:

On the title page, Item (73):

"Canon Kabushiki Kaisha, Tokyo, Japan" should read --Kabushiki Kaisha Toshiba, Kawasaki, Japan--.

Attorney, Agent or Firm information should be changed to read --OBLON, SPIVAK, McCLELLAND, MAIER & NEUSTADT--.

This certificate supersedes Certificate of Correction issued April 19, 1994.

Signed and Sealed this

Sixteenth Day of August, 1994

Attest:

BRUCE LEHMAN

Attesting Officer

Commissioner of Patents and Trademarks